(12) United States Patent
Wang et al.

(10) Patent No.: US 11,188,698 B2
(45) Date of Patent: Nov. 30, 2021

(54) METHOD FOR INTEGRATED OPTIMIZATION OF TERNARY FPRM CIRCUIT

(71) Applicant: Wenzhou University, Zhejiang (CN)

(72) Inventors: Pengjun Wang, Zhejiang (CN); Mingbo Wang, Zhejiang (CN); Bo Chen, Zhejiang (CN); Gang Li, Zhejiang (CN)

(73) Assignee: Wenzhou University, Zhejiang (CN)

( * ) Notice: Subject to any disclaimer, the term of this patent is extended or adjusted under 35 U.S.C. 154(b) by 200 days.

(21) Appl. No.: 16/691,622

(22) Filed: Nov. 22, 2019

(65) Prior Publication Data

US 2020/0167516 A1    May 28, 2020

(30) Foreign Application Priority Data

Nov. 22, 2018  (CN) .......................... 201811396189.5

(51) Int. Cl.
  *G06F 30/00*   (2020.01)
  *G06F 30/337*  (2020.01)
(52) U.S. Cl.
  CPC .................................. *G06F 30/337* (2020.01)
(58) Field of Classification Search
  CPC ............... G06F 30/337; G06F 2111/06; G06F 2119/06; G06F 2119/12
  See application file for complete search history.

(56) References Cited

U.S. PATENT DOCUMENTS 10,108,663 B2 * 10/2018 Wang .................. G06F 16/2453

FOREIGN PATENT DOCUMENTS

| CN | 107194023 A | * | 9/2017 | ......... G06F 16/2453 |
| CN | 108052696 A | * | 5/2018 | ......... G06F 16/2453 |

* cited by examiner

*Primary Examiner* — Naum Levin
(74) *Attorney, Agent, or Firm* — JCIP Global Inc.

(57) ABSTRACT

A method for integrated optimization of a ternary FPRM circuit comprises: establishing an area estimation model, a power consumption estimation model and a delay estimation model of a ternary FPRM circuit under a p polarity; constructing a correlation between a multi-objective teaching-learning optimization algorithm and optimization of an area, power consumption and a delay of the ternary FPRM circuit; expressing positions of the individuals in the multi-objective teaching-learning optimization algorithm as polarities of the ternary FPRM circuit, and expressing a search space as a space for polarity selection of the ternary FPRM circuit; and finally, searching for a set of Pareto optimum polarity solution for the area, power consumption and delay of the ternary FPRM circuit by means of the multi-objective teaching-learning optimization algorithm to complete the optimization of the area, power consumption and delay for the ternary FPRM circuits.

4 Claims, 2 Drawing Sheets

METHOD FOR INTEGRATED OPTIMIZATION OF TERNARY FPRM CIRCUIT

CROSS REFERENCE TO RELATED APPLICATION

This application claims the priority benefits of China application serial no. 201811396189.5, filed on Nov. 22, 2018. The entirety of the above-mentioned patent application is hereby incorporated by reference herein and made a part of specification.

BACKGROUND

Field of the Disclosure

The disclosure relates to a method for optimizing a ternary FPRM circuit, in particular to a method for integrated optimization of a ternary FPRM circuit.

Description of Related Art

Boolean logic and RM logic are two typical representations of ternary logic functions. Compared with traditional Boolean logic-based circuits, RM logic-based circuits (such as arithmetical logic circuits and communication circuits) have prominent advantages in the aspects of area, power consumption, speed and the like. Wherein, ternary FPRM function expressions are common logic expressions of ternary RM logic functions. A ternary FPRM logic function with n variables has $3^n$ ternary fixed polarities of RM logic in total, and different polarities represent different ternary FPRM function expressions which correspond to different area, power consumption and delay of ternary FPRM circuits. Therefore, the ternary fixed polarity of RM logic has important significance for optimizing the performance of ternary FPRM circuits such as the area, power consumption and delay.

Traditionally, integrated optimization of ternary FPRM circuits is achieved through a weighting coefficient method in such a manner that different weight coefficients of the area, power consumption and delay are set to search out the optimum polarity to fulfill integrated optimization of the circuits. However, this method has the following problems: first, the weight coefficients are difficult to select, and the final results may be different when different weight coefficients are set, thus resulting in poor robustness of the algorithm; and second, the method can only acquire one optimum solution, can only optimize one of the performance such as the area, power consumption or delay, and cannot meet the requirement for integrated optimization of the area, power consumption and delay of the ternary FPRM circuits.

SUMMARY OF THE DISCLOSURE

The technical issue to be settled by the disclosure is to provide a method for integrated optimization of a ternary FPRM circuit to search out an optimum polarity set of the ternary FPRM circuit so as to achieve a good optimization effect.

The technical solution adopted by the disclosure to solve the above technical issue is as follows: a method for integrated optimization of a ternary FPRM circuit comprises: establishing an area estimation model, a power consumption estimation model and a delay estimation model of the ternary FPRM circuit under a p polarity; constructing a correlation between a multi-objective teaching-learning optimization algorithm and optimization of an area, power consumption and delay of the ternary FPRM circuit; expressing positions of the individuals in the multi-objective teaching-learning optimization algorithm as polarities of the ternary FPRM circuit, and expressing a search space as a space for polarity selection of the ternary FPRM circuit; and finally, searching for a set of Pareto optimum polarity solutions for the area, power consumption and delay of the ternary FPRM circuit by means of the multi-objective teaching-learning optimization algorithm to complete the integrated optimization of the area, power consumption and delay of the ternary FRPM circuit.

The specific process of establishing the area estimation model, the power consumption estimation model and the delay estimation model of the ternary FPRM circuit under the p polarity is as follows:

a: a ternary FPRM function for the ternary FPRM circuit under the p polarity is expressed by the following expression:

$$f^p(x_{n-1}, x_{n-2}, \ldots, x_0) = \bigoplus \sum_{i=0}^{3^n-1} b_i \cdot \prod_{j=0}^{n-1} \dot{x}_j^{i_j} \quad (1)$$

Wherein, n is the number of input variables of the function $f^p(x_{n-1},x_{n-2}, \ldots,x_0)$; $x_{n-1},x_{n-2}, \ldots, x_0$ is the input variables of the function $f^p(x_{n-1},x_{n-2}, \ldots,x_0)$; $\oplus$ is a sign of modulo-3 addition, and $\Sigma$ is a summation sign; $b_i$ is an AND term, and $b_i \in \{0,1,2\}$; i is an AND term ordinal, i=0, 1, 2, \ldots, $3^n-1$, i is expressed as $i_{n-1}i_{n-2} \ldots i_0$, $i_j \in \{0,1,2\}$ in a ternary manner, and j=0, 1, 2, \ldots, n-1; p is the polarity of the ternary FPRM circuit and is expressed as $p_{n-1}p_{n-2} \ldots p_0$ in a ternary manner;

$$\prod_{j=0}^{n-1} \dot{x}_j^{i_j}$$

is a modulo-3 multiplication term, $\dot{x}_j^{i_j}$ is the power form of the $j^{th}$ modulo-3 multiplication term, and the expression form of the power form $\dot{x}_j^{i_j}$ is determined by the polarity p and the AND term ordinal i;

In the case of $p_j=0$, $\dot{x}_j^{i_j}$ appears in the modulo-3 multiplication term in an original power form $x_j^{i_j}$; if $i_j=0$, $\dot{x}_j^{i_j}=1$; if $i_j=1$, $\dot{x}_j^{i_j}=x_j$; if $i_j=2$, $\dot{x}_j^{i_j}=x_j^2$; $x_j^2=x_j \cdot x_j$, and "·" is a multiplication symbol;

In the case of $p_j=1$, $\dot{x}_j^{i_j}$ appears in the modulo-3 multiplication term in a complementary power form $(x_j \oplus 1)^{i_j}$; if $i_j=0$, $\dot{x}_j^{i_j}=1$; if $i_j=1$, $\dot{x}_j^{i_j}=x_j \oplus 1$; if $i_j=2$, $\dot{x}_j^{i_j}=(x_j \oplus 1)^2$;

In the case of $p_j=2$, $\dot{x}_j^{i_j}$ appears in the modulo-3 multiplication term in a complementary power form $(x_j \oplus 2)^{i_j}$; if $i_j=0$, $\dot{x}_j^{i_j}=1$; if $i_j=1$, $\dot{x}_j^{i_j}=x_j \oplus 2$; if $i_j=2$, $\dot{x}_j^{i_j}=(x_j \oplus 2)^2$;

b: the ternary FPRM circuit under the p polarity consists of multi-input modulo-3 addition terms regarded as multi-input modulo-3 addition gates and multi-input modulo-3 multiplication terms regarded as multi-input modulo-3 multiplication gates; all the multi-input modulo-3 multiplication gates in the ternary FPRM circuit expressed by the ternary FPRM function expression under the p polarity are decomposed into two-input modulo-3 multiplication gates by means of the Huffman algorithm, and the number of the two-input modulo-3 multiplication gates obtained by decomposition is marked as No.Mod_3M; then all the multi-input modulo-3 addition gates in the ternary FPRM circuit under the p polarity are decomposed into two-input modulo-3 addition gates by means of the Huffman algorithm, and the number of the two-input modulo-3 addition gates obtained by decomposition is marked as No.Mod_3A;

c: the area of the ternary FPRM circuit under the p polarity is marked as area(p), and the area estimation model of the ternary FPRM circuit under the p polarity is:

$$\text{area}(p) = \text{No.Mod\_3}A + \text{No.Mod\_3}M \quad (2)$$

d: in the decomposed ternary FPRM circuit under the p polarity, a path having the fewest two-input modulo-3 multiplication gates and two-input modulo-3 addition gates from an input signal to an output signal is used as a key path, and the number of the two-input modulo-3 multiplication gates and the two-input modulo-3 addition gates on the key path is marked as num(key);

e: the delay of the ternary FPRM circuit under the p polarity is marked as delay(p), and the delay estimation model of the ternary FPRM circuit under the p polarity is:

$$\text{delay}(p) = \text{num}(\text{key}) \quad (3)$$

f: the power consumption of the ternary FPRM circuit is marked as power(p), and power consumption of all the two-input modulo-3 addition gates and the two-input modulo-3 multiplication gates in the decomposed ternary FPRM circuit under the p polarity is used as the power consumption of the ternary FPRM circuit under the p polarity, wherein the power consumption of each two-input modulo-3 addition gate is represented by an on-off activity, the power consumption of each two-input modulo-3 multiplication gate is represented by an on-off activity, the on-off activity of each two-input modulo-3 addition gate is represented by the probability of an output variable of the two-input modulo-3 addition gate, and the on-off activity of each two-input modulo-3 multiplication gate is represented by the probability of an output variable of the two-input modulo-3 multiplication gate;

The probability of the output variable of the $k^{th}$ two-input modulo-3 multiplication gate in the decomposed ternary FPRM circuit under the p polarity is calculated according to formula (4), formula (5) and formula (6), wherein k=1, 2, ..., No.Mod_3M;

$$P_{mul1}^k = Pk_{1-1} \cdot Pk_{2-1} + Pk_{1-2} \cdot P_{2-2} \quad (4)$$

$$P_{mul2}^k = Pk_{1-1} \cdot Pk_{2-2} + Pk_{1-2} \cdot Pk_{2-1} \quad (5)$$

$$P_{mul0}^k = 1 - P_{mul1}^k - P_{mul2}^k \quad (6)$$

Wherein, $P_{mul1}^k$ refers to the probability of 1 of the output variable of the $k^{th}$ two-input modulo-3 multiplication gate in the decomposed ternary FPRM circuit under the p polarity; $P_{mul2}^k$ refers to the probability of 2 of the output variable of the $k^{th}$ two-input modulo-3 multiplication gate in the decomposed ternary FPRM circuit under the p polarity; $P_{mul0}^k$ refers to the probability of 0 of the output variable of the $k^{th}$ two-input modulo-3 multiplication gate in the decomposed ternary FPRM circuit under the p polarity; $Pk_{1-1}$ refers to the probability of 1 of a first input variable of the $k^{th}$ two-input modulo-3 multiplication gate in the decomposed ternary FPRM circuit under the p polarity, $Pk_{2-1}$ refers to the probability of 2 of the first input variable of the $k^{th}$ two-input modulo-3 multiplication gate in the decomposed ternary FPRM circuit under the p polarity, $Pk_{2-1}$ refers to the probability of 1 of a second input variable of the $k^{th}$ two-input modulo-3 multiplication gate in the decomposed ternary FPRM circuit under the p polarity, and $Pk_{2-2}$ refers to the probability of 2 of the second input variable of the $k^{th}$ two-input modulo-3 multiplication gate in the decomposed ternary FPRM circuit under the p polarity, wherein $Pk_{1-1}$, $Pk_{1-2}$, $Pk_{2-1}$ and $Pk_{2-2}$ are random numbers from 0 to 1;

The probability of the output variable of the $g^{th}$ two-input modulo-3 addition gate in the decomposed ternary FPRM circuit under the p polarity is calculated according to formula (7), formula (8) and formula (9), wherein g=1, 2, ..., No.Mod_3A;

$$Q_{add1}^g = Qg_{1-1} \cdot (1 - Qg_{2-1} - Qg_{2-2}) + Qg_{1-2} \cdot Qg_{2-2} + Qg_{2-1} \cdot (1 - Qg_{1-1} - Qg_{1-2}) \quad (7)$$

$$Q_{add2}^g = Qg_{1-2} \cdot (1 - Qg_{2-1} - Qg_{2-2}) + Qg_{1-1} \cdot Qg_{2-1} + Qg_{2-2} \cdot (1 - Qg_{1-1} - Qg_{1-2}) \quad (8)$$

$$Q_{add0}^g = 1 - Q_{add1}^g - Q_{add2}^g \quad (9)$$

Wherein, $Q_{add1}^g$ refers to the probability of 1 of the output variable of the $g^{th}$ two-input modulo-3 addition gate in the decomposed ternary FPRM circuit under the p polarity, $Q_{add2}^g$ refers to the probability of 2 of the output variable of the $g^{th}$ two-input modulo-3 addition gate in the decomposed ternary FPRM circuit under the p polarity, $Q_{add0}^g$ refers to the probability of 0 of the output variable of the $g^{th}$ two-input modulo-3 addition gate in the decomposed ternary FPRM circuit under the p polarity, $Qg_{1-1}$ refers to the probability of 1 of a first input variable of the $g^{th}$ two-input modulo-3 addition gate in the decomposed ternary FPRM circuit under the p polarity, $Qg_{1-2}$ refers to the probability of 2 of the first input variable of the $g^{th}$ two-input modulo-3 addition gate in the decomposed ternary FPRM circuit under the p polarity, $Qg_{2-1}$ refers to the probability of 1 of a second input variable of the $g^{th}$ two-input modulo-3 addition gate in the decomposed ternary FPRM circuit under the p polarity, and $Qg_{2-2}$ refers to the probability of 2 of the second input variable of the gth two-input modulo-3 addition gate in the decomposed ternary FPRM circuit under the p polarity, wherein $Qg_{1-1}$, $Qg_{1-2}$, $Qg_{2-1}$ and $Qg_{2-2}$ are random numbers from 0 to 1;

g: The power consumption of the ternary FPRM circuit is calculated according to the accumulation probability of the output variable of each two-input modulo-3 addition gate and the accumulation probability of the output variable of each two-input modulo-3 multiplication gate in the decomposed ternary FPRM circuit under the p polarity, and the power consumption estimation model of the ternary FPRM circuit under the p polarity is:

$$\text{power}(p) = 2 \left[ \sum_{k=1}^{\text{No.Mod\_3}M} (P_{mul1}^k + P_{mul2}^k) + \sum_{g=1}^{\text{No.Mod\_3}A} (Q_{add1}^g + Q_{add2}^g) \right] \quad (10)$$

The specific process of searching for the set of Pareto optimum polarity solution for the area, power consumption and delay of the ternary FPRM circuit by means of the multi-objective teaching-learning optimization algorithm is as follows:

Step 1: a population size is set as M, wherein M is an integer which is greater than or equal to 10 and smaller than or equal to 100, the position of each individual corresponds to one polarity of the ternary FPRM circuit; the number of total iterations of the multi-objective teaching-learning optimization algorithm set as T, wherein T is an integer which is greater than or equal to 100 and smaller than or equal to 500; the current iteration is set as a variable t, and the variable t is set to 0; the ternary FPRM function expression under the polarity corresponding to the position of each individual in the current population is obtained by means of a polarity conversion technique, and the area, power consumption and delay of the ternary FPRM circuit under each polarity are obtained in accordance with Step b to Step g;

Step 2: a polarity domination rule is set: the polarities corresponding to the positions of any two individuals in the population are marked as $P_1$ and $P_2$, if $P_1$ and $P_2$ meet:

$$\left. \begin{array}{l} \text{area}(P_1) \leq \text{area}(P_2) \\ \text{power}(P_1) \leq \text{power}(P_2) \\ \text{delay}(P_1) \leq \text{delay}(P_2) \end{array} \right\} \quad (11)$$

it is determined that $P_1$ dominates $P_2$, which is marked as $P_1 \succ P_2$, and in this case, the individual corresponding to $P_1$ dominates the individual corresponding to $P_2$; if the polarity $P_1$ is not dominated by the polarity corresponding to the position of any individual in the current population, $P_1$ is taken as one of the optimum polarity solutions of the Pareto relationship among the area, power consumption and delay of the ternary FPRM circuit;

Step 3: the polarity corresponding to the position of each individual in the current population is compared with the polarities corresponding to the positions of other individuals in the current population according to the polarity domination rule, the number of times of each individual being dominated by other individuals is calculated, and the non-dominant level of each individual is determined according to the number of times of each individual being dominated by other individuals; the non-dominant level of the individual which not dominated by all other individuals in the current population is set as the minimum level, and the non-dominant levels of these individuals increase with the increase of the number of times of these individuals being dominated by the individual with the smaller non-dominant level; if there are multiple individuals that are dominated by other individuals by the same times, the non-dominant levels of these population levels are identical; and the individuals with the minimum non-dominant level in the current population are acquired, and a current optimum individual set is formed by the individuals with the minimum non-dominant level acquired from the current population;

Step 4: an external repository for storing current optimum polarities is set, and the number of polarities capable of being stored by the external repository is marked as num(rep), wherein num(rep) is an integer which is greater than or equal to 10 and smaller than or equal to M; and the external repository having $t^{th}$-generation optimum polarities stored therein is called a $t^{th}$-generation external repository;

Step 5: individuals in the current optimum individual set are counted; if the number of the individuals in the current optimum individual set is smaller than or equal to num(rep), the polarities corresponding to the positions of the individuals in the current optimum individual set are all placed into the external repository; if the number of the individuals in the current optimum individual set is greater than num(rep), the crowding distance of the position of each individual in the current optimum individual set is calculated, num(rep) individuals are selected according to the crowding distances from high to low, and the polarities corresponding to the positions of the selected individuals are placed in the external repository to obtain the $t^{th}$-generation external repository;

Step 6: a value obtained by adding 1 to the current value of the variable t is used to update the variable t to obtain an updated variable t, the $t^{th}$-generation individual is derived from the $(t-1)^{th}$-generation individual, and the specific process is as follows:

A: primary variation is carried out on each individual in the $(t-1)^{th}$-generation population specifically as follows:

A-1: a mean and a teaching factor of the position, from the $1^{st}$ digit to the $n^{th}$ digit, of each individual in the $(t-1)^{th}$-generation population are calculated according to formula (12) and formula (13):

$$\text{mean}_q = \frac{1}{M} \sum_{h=1}^{M} X_{hq}^{old} \quad (12)$$

$$T_{hq} = \text{round}[1 + \text{rand}(0, 1)] \quad (13)$$

Wherein, $\text{mean}_q$ refers to the mean of the $q^{th}$ digit of the position of each individual in the $(t-1)^{th}$-generation population, and q=1, 2, ..., n; $X_{hq}^{old}$ refers to the $q^{th}$ digit of the position of the $h^{th}$ individual in the $(t-1)^{th}$-generation population, and h=1, 2, ... M; $T_{hq}$ refers to the variation factor of the $q^{th}$ digit of the $h^{th}$ individual in the $(t-1)^{th}$-generation population, rand(0,1) refers to a random number which is greater than or equal to 0 and smaller than or equal to 1, round(•) refers to rounding-off performed on the value of 1+rand(0,1) to obtain an integer;

A-2: M random number sets are sequentially generated by a random function, and the random number set generated at the $a^{th}$ time is taken as a $a^{th}$ random number set which is marked as $r_a$, wherein a=1, 2, ..., M, and each random number set includes n random numbers which are greater than or equal to 0 and smaller than or equal to 1;

A-3: the positions of the individuals corresponding to all the polarities in the $(t-1)^{th}$-generation external repository are taken as a group, the crowding distance of each individual in the group and the sum of the crowding distances of all the individuals in the group are calculated, and a value obtained by dividing the crowding distance of the position of each individual in the group by the sum of the crowding distances of the positions of all the individuals in the group is taken as the probability of being selected of the polarity corresponding to the position of each individual in the group, and in this way, the probability of being selected of all the polarities in the $(t-1)^{th}$-generation external repository is obtained; then, a random number from 0 to 1 is generated by the random function, polarities are sequentially selected from the $(t-1)^{th}$-generation external repository through a roulette method, the probability of being selected of the selected polarities is compared with the random number, the first selected polarity with the probability of being selected greater than the random number is taken as a $t^{th}$-generation optimum individual, and the difference between the mean of the $q^{th}$ digit of the position of the $t^{th}$-generation optimum individual and the mean of the $q^{th}$ digit of the position of the $h^{th}$ individual in the $(t-1)^{th}$-generation population is calculated according to formula (14);

$$\Delta_{hq} = r_{hq} \cdot (X_q^{best} - T_{hq} \cdot \text{mean}_q) \quad (14)$$

Wherein, $\Delta_{hq}$ refers to the difference between the mean of the $q^{th}$ digit of the position of the $t^{th}$-generation optimum individual and the mean of the $q^{th}$ digit of the position of the $h^{th}$ individual in the $(t-1)^{th}$-generation population, $X_q^{best}$ refers to the $q^{th}$ digit of the position of the $t^{th}$-generation optimum individual, and $r_{hq}$ refers to the $q^{th}$ random number in the $h^{th}$ random number set $r_h$;

A-4: primary variation parameters of the position, from the $1^{st}$ digit to the $n^{th}$ digit, of each individual in the $(t-1)^{th}$-generation population are calculated according to formula (15):

$$X_{hq}^{new} = \text{round}(X_{hq}^{old} + \Delta_{hq}) \quad (15)$$

Wherein, $X_{hq}^{old}$ refers to the $q^{th}$ digit of the position of the $h^{th}$ individual in the $(t-1)^{th}$-generation population, and $X_{hq}^{new}$ refers to the primary variation parameter of the $q^{th}$ digit of the position of the $h^{th}$ individual in the $(t-1)^{th}$-generation population;

A-5: Variation is carried out according to the value of $X_{hq}^{new}$; if $X_{hq}^{new}$ is greater than 2, the $q^{th}$ digit of the position of the $h^{th}$ individual in the $(t-1)^{th}$-generation population is changed into 2; if $X_{hq}^{new}$ is smaller than 0, the $q^{th}$ digit of the position of the $h^{th}$ individual in the $(t-1)^{th}$-generation population is changed into 0; if $X_{hq}^{new}$ is greater than or equal to 0 and is smaller than or equal to 2, the $q^{th}$ digit of the position of the $h^{th}$ individual in the $(t-1)^{th}$-generation population is changed into $X_{hq}^{new}$, so that a $t^{th}$-generation primary variation population is obtained;

B: secondary variation is carried out on the position of each individual in the $t^{th}$-generation primary variation population specifically as follows:

B-1: M random number sets are sequentially generated by a random function, the random number set generated at the $a^{th}$ time is used as a $a^{th}$ random number set which is marked as $r_a$, and the random number set $r_a$ includes n random numbers which are greater than or equal to 0 and smaller than or equal to 1; a random number set including M random integers which are greater than or equal to 1 and smaller than or equal to M is generated by the random function and is marked as Q, and the $a^{th}$ random number in the random number set Q is marked as $Q_a$;

B-2: a ternary FPRM function expression under the polarity corresponding to the position of each individual in the $t^{th}$-generation primary variation population is obtained by means of the polarity conversion technique, and the area, power consumption and delay of the ternary FPRM circuit under the polarity corresponding to each individual in the $t^{th}$-generation primary variation population are calculated in accordance with Step b to Step g;

B-3: the polarity corresponding to the position of the $Q_a^{th}$ individual in the $t^{th}$-generation primary variation population is compared with the polarity corresponding to the position of the $a^{th}$ individual in the $t^{th}$-generation primary variation population according to the polarity domination rule to obtain a non-dominant relationship between the polarity corresponding to the position of the $Q_a^{th}$ individual in the $t^{th}$-generation primary variation population and the polarity corresponding to the position of the $a^{th}$ individual in the $t^{th}$-generation primary variation population: if the polarity corresponding to the position of the $a^{th}$ individual in the $t^{th}$-generation primary variation population dominates the polarity corresponding to the position of the $Q_a^{th}$ individual in the $t^{th}$-generation primary variation population, or the polarity corresponding to the position of the $a^{th}$ individual in the $t^{th}$-generation primary variation population does not dominate the polarity corresponding to the position of the $Q_a^{th}$ individual in the $t^{th}$-generation primary variation population and is not dominated by the polarity corresponding to the position of the $Q_a^{th}$ individual in the $t^{th}$-generation primary variation population either, a secondary variation parameter of the $q^{th}$ digit of the position the $a^{th}$ individual in the $t^{th}$-generation primary variation population is calculated according to formula (16):

$$X_{aq}^{NEW} = \text{round}(S_{aq}^{new} + R_{aq} \cdot (S_{aq}^{new} - S_{Q_a q}^{new})) \quad (16)$$

If the polarity corresponding to the position of the $a^{th}$ individual in the $t^{th}$-generation primary variation population is dominated by the polarity corresponding to the position of the $Q_a^{th}$ individual in the $t^{th}$-generation primary variation population, a secondary variation parameter of the $q^{th}$ digit of the position of the $a^{th}$ individual in the $t^{th}$-generation primary variation population is calculated according to formula (17):

$$X_{aq}^{NEW} = \text{round}(S_{aq}^{new} + R_{aq} \cdot (S_{Q_a q}^{new} - S_{aq}^{new})) \quad (17)$$

Wherein, $X_{aq}^{NEW}$ refers to the secondary variation parameter of the $q^{th}$ digit of the position of the $a^{th}$ individual in the $t^{th}$-generation primary variation population, $R_{aq}$ refers to the $q^{th}$ random number in the $a^{th}$ random number set, $S_{aq}^{new}$ refers to the $q^{th}$ digit of the position of the $a^{th}$ individual in the $t^{th}$-generation primary variation population, and $S_{Q_a q}^{new}$ refers to the $q^{th}$ digit of the position of the $Q_a^{th}$ individual in the $t^{th}$-generation primary variation population;

B-4: variation is carried out according to the value of $X_{aq}^{NEW}$; if $X_{aq}^{NEW}$ is greater than 2, the $q^{th}$ digit of the position of the $a^{th}$ individual in the $t^{th}$-generation primary variation population is changed into 2; if $X_{aq}^{NEW}$ is smaller than 0, the $q^{th}$ digit of the position of the $a^{th}$ individual in the $t^{th}$-generation primary variation population is changed into 0; if $X_{aq}^{NEW}$ is greater than or equal to 0 and smaller than or equal to 2, the $q^{th}$ digit of the position of the $a^{th}$ individual in the $t^{th}$-generation primary variation population is changed into $X_{aq}^{NEW}$, so that a $t^{th}$-generation secondary variation population is obtained;

C: a ternary FPRM function expression under the polarity corresponding to the position of each individual in the $t^{th}$-generation secondary variation population is obtained by means of the polarity conversion technique, and the area, power consumption and delay of the ternary FPRM circuit under each polarity are calculated in accordance with Step b to Step g;

D: the $(t-1)^{th}$-generation population and the $t^{th}$-generation secondary variation population are combined into a first new population, the non-dominant level of each individual in the first new population is obtained in accordance with Step 2 and Step 3, and M individuals are selected from the first new population according to the non-dominant levels from low to high; if the number of all the individuals from the minimum non-dominant level to a certain non-dominant level is exactly equal to M, the M individuals are used to construct a $t^{th}$-generation population; if the number of all the individuals from the minimum non-dominant level to a certain non-dominant level is smaller than M and the number of all individuals from the minimum non-dominant level to a non-dominant level one level higher than the certain non-dominant level is greater than M, the crowding distances of all the individuals under the non-dominant level one level higher than the certain non-dominant level are calculated, the corresponding number of individuals are selected according to the crowding distances from high to low to make sure that the sum of the number of the individuals from the minimum non-dominant level to the certain non-dominant level and the number of the individuals selected from the non-dominant level one level higher than the certain non-dominant level is equal to M, and the M individuals are used to construct a $t^{th}$-generation population;

Step 7: the external repository is updated specifically as follows: the individuals corresponding to all the polarities in the $t^{th}$-generation population and the $(t-1)^{th}$-generation external repository are combined to form a second new population, the non-dominant level of each individual in the second new population is obtained in accordance with Step 2 and Step 3, the polarities in the $(t-1)^{th}$-generation external repository are cleared away, and individuals with the minimum non-dominant level in the second new population are counted; if the number of the individuals with the minimum non-dominant level in the second new population is smaller than or equal to num(rep), the polarities corresponding to all the individuals with the minimum non-dominant level in the second new population are placed into the external repository; if the number of the individuals with the minimum non-dominant level in the second new population is greater than num(rep), the crowding distance of the position of each individual with the minimum non-dominant level is calculated, num(rep) individuals with the minimum non-dominant level are selected according to the crowding distances from high to low, and the polarities corresponding to the positions of the num(rep) selected individuals with the minimum non-dominant level are placed in the external repository, so that a $t^{th}$-generation external repository is obtained;

Step 8: whether t is equal to T is determined; if yes, the polarities stored in the $t^{th}$-generation external repository forms an optimum polarity set meeting the Pareto relationship for the area, power consumption and delay of the ternary FPRM circuit, and optimization is ended; or if not, Step 6 is performed again for the next iteration.

The crowding distance of the position of each individual in the current optimum individual set is calculated in Step 5 specifically as follows:

Step 5-1: the number of all the individuals in the current optimum individual set is marked as size(rep);

Step 5-2: the area, power consumption and delay of the ternary FPRM circuit under the polarity corresponding to the position of each individual in the current optimum individual set are calculated in accordance with Step b and Step f, the individuals are ranked according to areas from small to large, and the crowding distance of the current $z^{th}$ individual is marked as $distance_z(0)$, wherein z=1, 2, ..., size(rep);

Step 5-3: the crowding distance of the $1^{st}$ individual is made to meet $distance_1(0)=10000$, and the crowding distance of the $(size(rep))^{th}$ individual is made to meet $distance_{size(rep)}(0)=10000$;

Step 5-4: the crowding distance of each individual from the $2^{nd}$ individual to the $(size(rep)-1)^{th}$ individual is calculated according to formula (18):

$$distance_v(0) = \frac{area_{v+1}(0) - area_{v-1}(0)}{\max(area(0)) - \min(area(0))} + \frac{power_{v+1}(0) - power_{v-1}(0)}{\max(power(0)) - \min(power(0))} + \frac{delay_{v+1}(0) - delay_{v-1}(0)}{\max(delay(0)) - \min(delay(0))} \quad (18)$$

Wherein, $distance_v(0)$ refers to the crowding distance of the $v^{th}$ individual, v=2, 3, ..., size(rep)-1, $area_{v+1}(0)$ refers to the area of the ternary FPRM circuit under the polarity corresponding to the position of the $(v+1)^{th}$ individual, $area_{v-1}(0)$ refers to the area of the ternary FPRM circuit under the polarity corresponding to the position of the $(v-1)^{th}$ individual, max(area(0)) refers to the maximum value of the area of the ternary FPRM circuit under the polarities corresponding to the positions of all the individuals in the current optimum individual set, min(area(0)) refers to the minimum value of the area of the ternary FPRM circuit under the polarities corresponding to the positions of all the individuals in the current optimum individual set, $power_{v+1}(0)$ refers to the power consumption of the ternary FPRM circuit under the polarity corresponding to the position of the $(v+1)^{th}$ individual, $power_{v-1}(0)$ refers to the power consumption of the ternary FPRM circuit under the polarity corresponding to the position of the $(v-1)^{th}$ individual, min(power(0)) refers to the maximum value of the power consumption of the ternary FPRM circuit under the polarities corresponding to the positions of all the individuals in the current optimum individual set, min(power(0)) refers to the minimum value of the power consumption of the ternary FPRM circuit under the polarities corresponding to the positions of all the individuals in the current optimum individual set, $delay_{v+1}(0)$ refers to the delay of the ternary FPRM circuit under the polarity corresponding to the position of the $(v+1)^{th}$ individual, $delay_{v-1}(0)$ refers to the delay of the ternary FPRM circuit under the polarity corresponding to the position of the $(v-1)^{th}$ individual, max(delay(0)) refers to the maximum value of the delay of the ternary FPRM circuit under the polarities corresponding to the positions of all the individuals in the current optimum individual set, and min(delay(0)) refers to the minimum value of the delay of the ternary FPRM circuit under the polarities corresponding to the positions of all the individuals in the current optimum individual set;

The method for calculating the crowding distance of the positions of the individuals in Step D and Step 7 is the same as the method for calculating the crowding distance of the positions of the individuals in Step 5.

Compared with the related art, the disclosure has the following advantages: an area estimation model, a power consumption estimation module and a delay estimation model of a ternary FPRM circuit under the p polarity are established, and then the correlation between a multi-objective teaching-learning optimization algorithm and optimization of an area, power consumption and a delay of the ternary FPRM circuit is constructed; positions of the individuals in the multi-objective teaching-learning optimization algorithm are expressed as polarities of the ternary FPRM circuit, and a search space is expressed as a space for polarity selection of the ternary FPRM circuit; and finally, a set of Pareto optimum polarity solution for the area, power consumption and delay of the ternary FPRM circuit is searched for by means of the multi-objective teaching-learning optimization algorithm to complete the optimization of the area, power consumption and delay for the ternary FPRM circuits. In the optimization process, the multi-objective teaching-learning optimization algorithm is based on the Pareto criterion, so that the optimum polarity set of the circuit can be obtained without repeated setting of the values of weight coefficients of the area, power consumption and delay of the circuit, and then the optimum polarity solution set of the circuit is obtained. Through tests on 12 Benchmark circuits, the method for integrated optimization of a ternary FPRM circuit has the advantages of good optimization effect and good robustness against TLBO, MOPSO or NSGA-II-based area, power consumption and delay methods.

DESCRIPTION OF EMBODIMENTS

Figure 1:
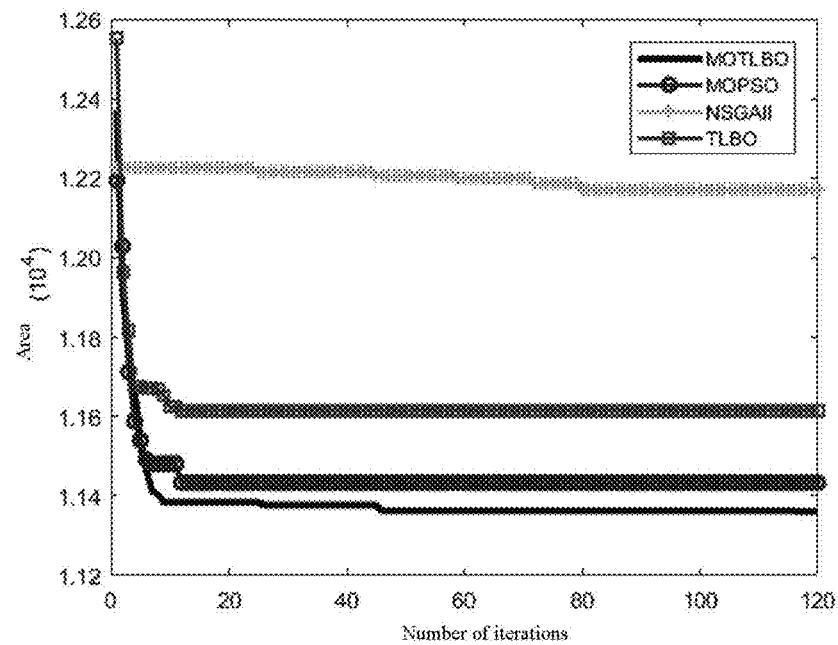
FIG. 1 is diagram of iterative evolution curves of the circuit area of each generation after five times of operating of a method of the disclosure and three existing methods.

The disclosure is further expounded below with reference to the accompanying drawings and embodiments.

Embodiment: a method for integrated optimization of a ternary FPRM circuit comprises: an area estimation model, a power consumption estimation model and a delay estimation model of a ternary FPRM circuit under a p polarity are established; a correlation between a multi-objective teaching-learning optimization algorithm and optimization of an area, power consumption and a delay of the ternary FPRM circuit is constructed; positions of the individuals in the multi-objective teaching-learning optimization algorithm are expressed as polarities of the ternary FPRM circuit, and a search space is expressed as a space for polarity selection of the ternary FPRM circuit; and finally, a set of Pareto optimum polarity solution for the area, power consumption and delay of the ternary FPRM circuit is searched for by means of the multi-objective teaching-learning optimization algorithm to complete the optimization of the area, power consumption and delay.

In this embodiment, the specific process of establishing the area estimation model, the power consumption estimation model and the delay estimation model of the ternary FPRM circuit under the p polarity is as follows:

a: a ternary FPRM function for the ternary FPRM circuit under the p polarity is expressed by the following expression:

$$f^p(x_{n-1}, x_{n-2}, \ldots, x_0) = \bigoplus_{i=0}^{3^n-1} b_i \cdot \prod_{j=0}^{n-1} \dot{x}_j^{i_j} \quad (1)$$

Wherein, n is the number of input variables of the function $f^p(x_{n-1},x_{n-2}, \ldots ,x_0)$; $x_{n-1},x_{n-2}, \ldots , x_0$ is the input variables of the function $f^p(x_{n-1},x_{n-2}, \ldots ,x_0)$; $\oplus$ is a sign of modulo-3 addition, and $\Sigma$ is a summation sign; $b_i$ is an AND term, and $b_i \in \{0,1,2\}$; i is an AND term ordinal, i=0, 1, 2, . . . , $3^n-1$, i is expressed as $i_{n-1}i_{n-2} \ldots i_0$, $i_j \in \{0,1,2\}$ in a ternary manner, and j=0, 1, 2, . . . , n−1; p is the polarity of the ternary FPRM circuit and is expressed as $p_{n-1}p_{n-2} \ldots p_0$ in a ternary manner;

$$\prod_{j=0}^{n-1} \dot{x}_j^{i_j}$$

is a modulo-3 multiplication term, $\dot{x}_j^{i_j}$ is the power form of the $j^{th}$ modulo-3 multiplication term, and the expression form of the power form $\dot{x}_j^{i_j}$ is determined by the polarity p and the AND term ordinal i;

In the case of $p_j=0$, $\dot{x}_j^{i_j}$ appears in the modulo-3 multiplication term in an original power form $x_j^{i_j}$; if $i_j=0$, $\dot{x}_j^{i_j}=1$; if $i_j=1$, $\dot{x}_j^{i_j}=x_j$; if $i_j=2$, $\dot{x}_j^{i_j}=x_j^2$; $x_j^2=x_j\cdot x_j$, and "·" is a multiplication symbol;

In the case of $p_j=1$, $\dot{x}_j^{i_j}$ appears in the modulo-3 multiplication term in a complementary power form $(x_j\oplus1)^{i_j}$; if $i_j=0$, $\dot{x}_j^{i_j}=1$; if $i_j=1$, $\dot{x}_j^{i_j}=x_j\oplus1$; if $i_j=2$, $\dot{x}_j^{i_j}=(x_j\oplus1)^2$;

In the case of $p_j=2$, $\dot{x}_j^{i_j}$ appears in the modulo-3 multiplication term in a complementary power form $(x_j\oplus2)^{i_j}$; if $i_j=0$, $\dot{x}_j^{i_j}=1$; if $i_j=1$, $\dot{x}_j^{i_j}=x_j\oplus2$; if $i_j=2$, $\dot{x}_j^{i_j}=(x_j\oplus2)^2$;

b: the ternary FPRM circuit under the p polarity consists of multi-input modulo-3 addition terms regarded as multi-input modulo-3 addition gates and multi-input modulo-3 multiplication terms regarded as multi-input modulo-3 multiplication gates; all the multi-input modulo-3 multiplication gates in the ternary FPRM circuit expressed by the ternary FPRM function expression under the p polarity are decomposed into two-input modulo-3 multiplication gates by means of the Huffman algorithm, and the number of the two-input modulo-3 multiplication gates obtained by decomposition is marked as No.Mod_3M; then all the multi-input modulo-3 addition gates in the ternary FPRM circuit under the p polarity are decomposed into two-input modulo-3 addition gates by means of the Huffman algorithm, and the number of the two-input modulo-3 addition gates obtained by decomposition is marked as No.Mod_3A;

c: the area of the ternary FPRM circuit under the p polarity is marked as area(p), and the area estimation model of the ternary FPRM circuit under the p polarity is:

$$\text{area}(p)=\text{No.Mod\_3}A+\text{No.Mod\_3}M \quad (2)$$

d: in the decomposed ternary FPRM circuit under the p polarity, a path having the fewest two-input modulo-3 multiplication gates and two-input modulo-3 addition gates from an input signal to an output signal is used as a key path, and the number of the two-input modulo-3 multiplication gates and the two-input modulo-3 addition gates on the key path is marked as num(key);

e: the delay of the ternary FPRM circuit under the p polarity is marked as delay(p), and the delay estimation model of the ternary FPRM circuit under the p polarity is:

$$\text{delay}(p)=\text{num(key)} \quad (3)$$

f: the power consumption of the ternary FPRM circuit is marked as power(p), and power consumption of all the two-input modulo-3 addition gates and the two-input modulo-3 multiplication gates in the decomposed ternary FPRM circuit under the p polarity is used as the power consumption of the ternary FPRM circuit under the p polarity, wherein the power consumption of each two-input modulo-3 addition gate is represented by an on-off activity, the power consumption of each two-input modulo-3 multiplication gate is represented by an on-off activity, the on-off activity of each two-input modulo-3 addition gate is represented by the probability of an output variable of the two-input modulo-3 addition gate, and the on-off activity of each two-input modulo-3 multiplication gate is represented by the probability of an output variable of the two-input modulo-3 multiplication gate;

The probability of the output variable of the $k^{th}$ two-input modulo-3 multiplication gate in the decomposed ternary FPRM circuit under the p polarity is calculated according to formula (4), formula (5) and formula (6), wherein k=1, 2, . . . , No.Mod_3M;

$$P_{mul1}^k = Pk_{1-1}\cdot Pk_{2-1}+Pk_{1-2}\cdot P_{2-2} \quad (4)$$

$$P_{mul2}^k = Pk_{1-1}\cdot Pk_{2-2}+Pk_{1-2}\cdot Pk_{2-1} \quad (5)$$

$$P_{mul0}^k = 1 - P_{mul1}^k - P_{mul2}^k \quad (6)$$

Wherein, $P_{mul1}^k$ refers to the probability of 1 of the output variable of the $k^{th}$ two-input modulo-3 multiplication gate in the decomposed ternary FPRM circuit under the p polarity; $P_{mul2}^k$ refers to the probability of 2 of the output variable of the $k^{th}$ two-input modulo-3 multiplication gate in the decomposed ternary FPRM circuit under the p polarity; $P_{mul0}^k$ refers to the probability of 0 of the output variable of the $k^{th}$ two-input modulo-3 multiplication gate in the decomposed ternary FPRM circuit under the p polarity; $Pk_{1-1}$ refers to the probability of 1 of a first input variable of the $k^{th}$ two-input modulo-3 multiplication gate in the decomposed ternary FPRM circuit under the p polarity, $Pk_{2-1}$ refers to the probability of 2 of the first input variable of the $k^{th}$ two-input modulo-3 multiplication gate in the decomposed ternary FPRM circuit under the p polarity, $Pk_{2-1}$ refers to the probability of 1 of a second input variable of the $k^{th}$ two-input modulo-3 multiplication gate in the decomposed ternary FPRM circuit under the p polarity, and $Pk_{2-2}$ refers to the probability of 2 of the second input variable of the $k^{th}$ two-input modulo-3 multiplication gate in the decomposed ternary FPRM circuit under the p polarity, wherein $Pk_{1-1}$, $Pk_{1-2}$, $Pk_{2-1}$ and $Pk_{2-2}$ are random numbers from 0 to 1 generated by a random function;

The probability of the output variable of the $g^{th}$ two-input modulo-3 addition gate in the decomposed ternary FPRM circuit under the p polarity is calculated according to formula (7), formula (8) and formula (9), wherein g=1, 2, ..., No.Mod_3A;

$$Q_{add1}^g = Qg_{1-1} \cdot (1 - Qg_{2-1} - Qg_{2-2}) + Qg_{1-2} \cdot Qg_{2-2} + Qg_{2-1} \cdot (1 - Qg_{1-1} - Qg_{1-2}) \quad (7)$$

$$Q_{add2}^g = Qg_{1-2} \cdot (1 - Qg_{2-1} - Qg_{2-2}) + Qg_{1-1} \cdot Qg_{2-1} + Qg_{2-2} \cdot (1 - Qg_{1-1} - Qg_{1-2}) \quad (8)$$

$$Q_{add0}^g = 1 - Q_{add1}^g - Q_{add2}^g \quad (9)$$

Wherein, $Q_{add1}^g$ refers to the probability of 1 of the output variable of the $g^{th}$ two-input modulo-3 addition gate in the decomposed ternary FPRM circuit under the p polarity, $Q_{add2}^g$ refers to the probability of 2 of the output variable of the $g^{th}$ two-input modulo-3 addition gate in the decomposed ternary FPRM circuit under the p polarity, $Q_{add0}^g$ refers to the probability of 0 of the output variable of the $g^{th}$ two-input modulo-3 addition gate in the decomposed ternary FPRM circuit under the p polarity, $Qg_{1-1}$ refers to the probability of 1 of a first input variable of the $g^{th}$ two-input modulo-3 addition gate in the decomposed ternary FPRM circuit under the p polarity, $Qg_{1-2}$ refers to the probability of 2 of the first input variable of the $g^{th}$ two-input modulo-3 addition gate in the decomposed ternary FPRM circuit under the p polarity, $Qg_{2-1}$ refers to the probability of 1 of a second input variable of the $g^{th}$ two-input modulo-3 addition gate in the decomposed ternary FPRM circuit under the p polarity, and $Qg_{2-2}$ refers to the probability of 2 of the second input variable of the gth two-input modulo-3 addition gate in the decomposed ternary FPRM circuit under the p polarity, wherein $Qg_{1-1}$, $Qg_{1-2}$, $Qg_{2-1}$ and $Qg_{2-2}$ are random numbers from 0 to 1;

g: The power consumption of the ternary FPRM circuit is calculated according to the probability of the output variable of each two-input modulo-3 addition gate and the probability of the output variable of each two-input modulo-3 multiplication gate in the decomposed ternary FPRM circuit under the p polarity, and the power consumption estimation model of the ternary FPRM circuit under the p polarity is:

$$\text{power}(p) = 2 \left[ \sum_{k=1}^{No.Mod\_3M} (P_{mul1}^k + P_{mul2}^k) + \sum_{g=1}^{No.Mod\_3A} (Q_{add1}^g + Q_{add2}^g) \right] \quad (10)$$

In this embodiment, the specific process of searching for the set of Pareto optimum polarity solution for the area, power consumption and delay of the ternary FPRM circuit by means of the multi-objective teaching-learning optimization algorithm is as follows:

Step 1: a population size is set as M, wherein M is an integer which is greater than or equal to 2 and smaller than or equal to 100, the position of each individual is the n-digit ternary number corresponding to one polarity of the ternary FPRM circuit; the number of total iterations of the multi-objective teaching-learning optimization algorithm set as T, wherein T is an integer which is greater than or equal to 100 and smaller than or equal to 500; the current iteration is set as a variable t, and the variable t is set to 0; the ternary FPRM function expression under the polarity corresponding to the position of each individual in the current population is obtained by means of a polarity conversion technique, and the area, power consumption and delay of the ternary FPRM circuit under each polarity are obtained in accordance with Step b to Step g;

Step 2: a polarity domination rule is set: the polarities corresponding to the positions of any two individuals in the population are marked as $P_1$ and $P_2$, if $P_1$ and $P_2$ meet:

$$\left. \begin{array}{l} \text{area}(P_1) \leq \text{area}(P_2) \\ \text{power}(P_1) \leq \text{power}(P_2) \\ \text{delay}(P_1) \leq \text{delay}(P_2) \end{array} \right\} \quad (11)$$

it is determined that $P_1$ dominates $P_2$, which is marked as $P_1 \succ P_2$, and in this case, the individual corresponding to $P_1$ dominates the individual corresponding to $P_2$; if the polarity $P_1$ is not dominated by the polarity corresponding to the position of any individual in the current population, $P_1$ is taken as one of the optimum polarity solutions of the Pareto relationship among the area, power consumption and delay of the ternary FPRM circuit;

Step 3: the polarity corresponding to the position of each individual in the current population is compared with the polarities corresponding to the positions of other individuals in the current population according to the polarity domination rule, the number of times of each individual being dominated by other individuals is calculated, and the non-dominant level of each individual is determined according to the number of times of each individual being dominated by other individuals; the non-dominant level of the individual which not dominated by all other individuals in the current population is set as the minimum level, and the non-dominant levels of these individuals increase with the increase of the number of times of these individuals being dominated by the individual with the smaller non-dominant level; if there are multiple individuals that are dominated by other individuals by the same times, the non-dominant levels of these population levels are identical; and the individuals with the minimum non-dominant level in the current population are acquired, and a current optimum individual set is formed by the individuals with the minimum non-dominant level acquired from the current population;

Step 4: an external repository for storing current optimum polarities is set, and the number of polarities capable of being stored by the external repository is marked as num(rep), wherein num(rep) is an integer which is greater than or equal to 10 and smaller than or equal to M; and the external repository having tth-generation optimum polarities stored therein is called a tth-generation external repository;

Step 5: individuals in the current optimum individual set are counted; if the number of the individuals in the current optimum individual set is smaller than or equal to num(rep), the polarities corresponding to the positions of the individuals in the current optimum individual set are all placed into the external repository; if the number of the individuals in the current optimum individual set is greater than num(rep), the crowding distance of the position of each individual in the current optimum individual set is calculated, num(rep) individuals are selected according to the crowding distances from high to low, and the polarities corresponding to the positions of the selected individuals are placed in the external repository to obtain the $t^{th}$-generation external repository;

Step 6: a value obtained by adding 1 to the current value of the variable t is used to update the variable t to obtain an updated variable t, the tth-generation individual is derived from the (t−1)th-generation individual, and the specific process is as follows:

A: primary variation is carried out on each individual in the (t−1)th-generation population specifically as follows:

A-1: a mean and a teaching factor of the position, from the 1st digit to the nth digit, of each individual in the $(t-1)^{th}$-generation population are calculated according to formula (12) and formula (13):

$$mean_q = \frac{1}{M}\sum_{h=1}^{M} X_{hq}^{old} \qquad (12)$$

$$T_{hq} = \text{round}[1 + \text{rand}(0, 1)] \qquad (13)$$

Wherein, $mean_q$ refers to the mean of the $q^{th}$ digit of the position of each individual in the $(t-1)^{th}$-generation population, and q=1, 2, ..., n; $X_{hq}^{old}$ refers to the $q^{th}$ digit of the position of the $h^{th}$ individual in the $(t-1)^{th}$-generation population, and h=1, 2, ... M; $T_{hq}$ refers to the variation factor of the qth digit of the hth individual in the (t−1)th-generation population, rand(0,1) refers to a random number which is greater than or equal to 0 and smaller than or equal to 1, round(•) refers to rounding-off performed on the value of 1+rand(0,1) to obtain an integer;

A-2: M random number sets are sequentially generated by a random function, and the random number set generated at the $a^{th}$ time is taken as a $a^{th}$ random number set which is marked as $r_a$, wherein a=1, 2, ..., M, and each random number set includes n random numbers which are greater than or equal to 0 and smaller than or equal to 1;

A-3: the positions of the individuals corresponding to all the polarities in the $(t-1)^{th}$-generation external repository are taken as a group, the crowding distance of each individual in the group and the sum of the crowding distances of all the individuals in the group are calculated, and a value obtained by dividing the crowding distance of the position of each individual in the group by the sum of the crowding distances of the positions of all the individuals in the group is taken as the probability of being selected of the polarity corresponding to the position of each individual in the group, and in this way, the probability of being selected of all the polarities in the $(t-1)^{th}$-generation external repository is obtained; then, a random number from 0 to 1 is generated by the random function, polarities are sequentially selected from the $(t-1)^{th}$-generation external repository through a roulette method, the probability of being selected of the selected polarities is compared with the random number, the first selected polarity with the probability of being selected greater than the random number is taken as a $t^{th}$-generation optimum individual, and the difference between the mean of the $q^{th}$ digit of the position of the $t^{th}$-generation optimum individual and the mean of the $q^{th}$ digit of the position of the $h^{th}$ individual in the $(t-1)^{th}$-generation population is calculated according to formula (14);

$$\Delta_{hq} = r_{hq} \cdot (X_q^{best} - T_{hq} \cdot mean_q) \qquad (14)$$

Wherein, $\Delta_{hq}$ refers to the difference between the mean of the $q^{th}$ digit of the position of the $t^{th}$-generation optimum individual and the mean of the $q^{th}$ digit of the position of the $h^{th}$ individual in the $(t-1)^{th}$-generation population, $X_q^{best}$ refers to the $q^{th}$ digit of the position of the $t^{th}$-generation optimum individual, and $r_{hq}$ refers to the $q^{th}$ random number in the $h^{th}$ random number set $r_h$;

A-4: primary variation parameters of the position, from the $1^{st}$ digit to the $n^{th}$ digit, of each individual in the $(t-1)^{th}$-generation population are calculated according to formula (15):

$$X_{hq}^{new} = \text{round}(X_{hq}^{old} + \Delta_{hq}) \qquad (15)$$

Wherein, $X_{hq}^{old}$ refers to the $q^{th}$ digit of the position of the $h^{th}$ individual in the $(t-1)^{th}$-generation population, and $X_{hq}^{new}$ refers to the primary variation parameter of the $q^{th}$ digit of the position of the $h^{th}$ individual in the $(t-1)^{th}$-generation population;

A-5: Variation is carried out according to the value of $X_{hq}^{new}$; if $X_{hq}^{new}$ is greater than 2, the $q^{th}$ digit of the position of the $h^{th}$ individual in the $(t-1)^{th}$-generation population is changed into 2; if $X_{hq}^{new}$ is smaller than 0, the $q^{th}$ digit of the position of the $h^{th}$ individual in the $(t-1)^{th}$-generation population is changed into 0; if $X_{hq}^{new}$ is greater than or equal to 0 and is smaller than or equal to 2, the $q^{th}$ digit of the position of the $h^{th}$ individual in the $(t-1)^{th}$-generation population is changed into $X_{hq}^{new}$, so that a $t^{th}$-generation primary variation population is obtained;

B: secondary variation is carried out on the position of each individual in the $t^{th}$-generation primary variation population specifically as follows:

B-1: M random number sets are sequentially generated by a random function, the random number set generated at the ath time is used as a ath random number set which is marked as $r_a$, and the random number set $r_a$ includes n random numbers which are greater than or equal to 0 and smaller than or equal to 1; a random number set including M random integers which are greater than or equal to 1 and smaller than or equal to M is generated by the random function and is marked as Q, and the $a^{th}$ random number in the random number set Q is marked as $Q_a$;

B-2: a ternary FPRM function expression under the polarity corresponding to the position of each individual in the $t^{th}$-generation primary variation population is obtained by means of the polarity conversion technique, and the area, power consumption and delay of the ternary FPRM circuit under the polarity corresponding to each individual in the $t^{th}$-generation primary variation population are calculated in accordance with Step b to Step g;

B-3: the polarity corresponding to the position of the Qath individual in the tth-generation primary variation population is compared with the polarity corresponding to the position of the $a^{th}$ individual in the $t^{th}$-generation primary variation population according to the polarity domination rule to obtain a non-dominant relationship between the polarity corresponding to the position of the $Q_a^{th}$ individual in the $t^{th}$-generation primary variation population and the polarity corresponding to the position of the $a^{th}$ individual in the $t^{th}$-generation primary variation population: if the polarity corresponding to the position of the $a^{th}$ individual in the $t^{th}$-generation primary variation population dominates the polarity corresponding to the position of the $Q_a^{th}$ individual in the $t^{th}$-generation primary variation population, or the polarity corresponding to the position of the $a^{th}$ individual in the $t^{th}$-generation primary variation population does not dominate the polarity corresponding to the position of the $Q_a^{th}$ individual in the $t^{th}$-generation primary variation population and is not dominated by the polarity corresponding to the position of the $Q_a^{th}$ individual in the $t^{th}$-generation primary variation population either, a secondary variation parameter of the $q^{th}$ digit of the position the $a^{th}$ individual in the $t^{th}$-generation primary variation population is calculated according to formula (16):

$$X_{aq}^{NEW}=\text{round}(S_{aq}^{new}+R_{aq}\cdot(S_{aq}^{new}-S_{Q_aq}^{new})) \quad (16)$$

If the polarity corresponding to the position of the $a^{th}$ individual in the $t^{th}$-generation primary variation population is dominated by the polarity corresponding to the position of the $Q_a^{th}$ individual in the $t^{th}$-generation primary variation population, a secondary variation parameter of the $q^{th}$ digit of the position of the $a^{th}$ individual in the $t^{th}$-generation primary variation population is calculated according to formula (17):

$$X_{aq}^{NEW}=\text{round}(S_{aq}^{new}+R_{aq}\cdot(S_{Q_aq}^{new}-S_{aq}^{new})) \quad (17)$$

Wherein, $X_{aq}^{NEW}$ refers to the secondary variation parameter of the $q^{th}$ digit of the position of the $a^{th}$ individual in the $t^{th}$-generation primary variation population, $R_{aq}$ refers to the $q^{th}$ random number in the ath random number set, $S_{aq}^{new}$ refers to the qth digit of the position of the ath individual in the tth-generation primary variation population, and $S_{Q_aq}^{new}$ refers to the qth digit of the position of the Qath individual in the tth-generation primary variation population;

B-4: variation is carried out according to the value of $X_{aq}^{NEW}$; if $X_{aq}^{NEW}$ is greater than 2, the $q^{th}$ digit of the position of the $a^{th}$ individual in the $t^{th}$-generation primary variation population is changed into 2; if $X_{aq}^{NEW}$ is smaller than 0, the $q^{th}$ digit of the position of the $a^{th}$ individual in the $t^{th}$-generation primary variation population is changed into 0; if $X_{aq}^{NEW}$ is greater than or equal to 0 and smaller than or equal to 2, the $q^{th}$ digit of the position of the $a^{th}$ individual in the $t^{th}$-generation primary variation population is changed into $X_{aq}^{NEW}$, so that a $t^{th}$-generation secondary variation population is obtained;

C: a ternary FPRM function expression under the polarity corresponding to the position of each individual in the tth-generation secondary variation population is obtained by means of the polarity conversion technique, and the area, power consumption and delay of the ternary FPRM circuit under each polarity are calculated in accordance with Step b to Step g;

D: the (t−1)th-generation population and the $t^{th}$-generation secondary variation population are combined into a first new population, the non-dominant level of each individual in the first new population is obtained in accordance with Step 2 and Step 3, and M individuals are selected from the first new population according to the non-dominant levels from low to high; if the number of all the individuals from the minimum non-dominant level to a certain non-dominant level is exactly equal to M, the M individuals are used to construct a $t^{th}$-generation population; if the number of all the individuals from the minimum non-dominant level to a certain non-dominant level is smaller than M and the number of all individuals from the minimum non-dominant level to a non-dominant level one level higher than the certain non-dominant level is greater than M, the crowding distances of all the individuals under the non-dominant level one level higher than the certain non-dominant level are calculated, the corresponding number of individuals are selected according to the crowding distances from high to low to make sure that the sum of the number of the individuals from the minimum non-dominant level to the certain non-dominant level and the number of the individuals selected from the non-dominant level one level higher than the certain non-dominant level is equal to M, and the M individuals are used to construct a $t^{th}$-generation population;

Step 7: the external repository is updated specifically as follows: the individuals corresponding to all the polarities in the $t^{th}$-generation population and the $(t-1)^{th}$-generation external repository are combined to form a second new population, the non-dominant level of each individual in the second new population is obtained in accordance with Step 2 and Step 3, the polarities in the $(t-1)^{th}$-generation external repository are cleared away, and individuals with the minimum non-dominant level in the second new population are counted; if the number of the individuals with the minimum non-dominant level in the second new population is smaller than or equal to num(rep), the polarities corresponding to all the individuals with the minimum non-dominant level in the second new population are placed into the external repository; if the number of the individuals with the minimum non-dominant level in the second new population is greater than num(rep), the crowding distance of the position of each individual with the minimum non-dominant level is calculated, num(rep) individuals with the minimum non-dominant level are selected according to the crowding distances from high to low, and the polarities corresponding to the positions of the num(rep) selected individuals with the minimum non-dominant level are placed in the external repository, so that a $t^{th}$-generation external repository is obtained;

Step 8: whether t is equal to T is determined; if yes, the polarities stored in the $t^{th}$-generation external repository forms an optimum polarity set meeting the Pareto relationship for the area, power consumption and delay of the ternary FPRM circuit, and optimization is ended; or if not, Step 6 is performed again for the next iteration.

In this embodiment, the crowding distance of the position of each individual in the current optimum individual set is calculated in Step 5 specifically as follows:

Step 5-1: the number of all the individuals in the current optimum individual set is marked as size(rep);

Step 5-2: the area, power consumption and delay of the ternary FPRM circuit under the polarity corresponding to the position of each individual in the current optimum individual set are calculated in accordance with Step b and Step f, the individuals are ranked according to areas from small to large, and the crowding distance of the current $z^{th}$ individual is marked as $distance_z(0)$, wherein z=1, 2, ..., size(rep);

Step 5-3: the crowding distance of the $1^{st}$ individual is made to meet $distance_1(0)=10000$, and the crowding distance of the $(size(rep))^{th}$ individual is made to meet $distance_{size(rep)}(0)=10000$;

Step 5-4: the crowding distance of each individual from the $2^{nd}$ individual to the $(size(rep)-1)^{th}$ individual is calculated according to formula (18):

$$distance_v(0) = \frac{area_{v+1}(0) - area_{v-1}(0)}{\max(area(0)) - \min(area(0))} + \quad (18)$$

$$\frac{power_{v+1}(0) - power_{v-1}(0)}{\max(power(0)) - \min(power(0))} + \frac{delay_{v+1}(0) - delay_{v-1}(0)}{\max(delay(0)) - \min(delay(0))}$$

Wherein, $distance_v(0)$ refers to the crowding distance of the $v^{th}$ individual, v=2, 3, ..., size(rep)−1, $area_{v+1}(0)$ refers to the area of the ternary FPRM circuit under the polarity corresponding to the position of the $(v+1)^{th}$ individual, $area_{v-1}(0)$ refers to the area of the ternary FPRM circuit under the polarity corresponding to the position of the $(v-1)^{th}$ individual, max(area(0)) refers to the maximum value of the area of the ternary FPRM circuit under the polarities corresponding to the positions of all the individuals in the current optimum individual set, min(area(0)) refers to the minimum value of the area of the ternary FPRM circuit under the polarities corresponding to the positions of all the individuals in the current optimum individual set, $power_{v+1}(0)$ refers to the power consumption of the ternary FPRM circuit under the polarity corresponding to the position of the $(v+1)^{th}$ individual, $power_{v-1}(0)$ refers to the power consumption of the ternary FPRM circuit under the polarity corresponding to the position of the $(v-1)^{th}$ individual, min(power(0)) refers to the maximum value of the power consumption of the ternary FPRM circuit under the polarities corresponding to the positions of all the individuals in the current optimum individual set, min(power(0)) refers to the minimum value of the power consumption of the ternary FPRM circuit under the polarities corresponding to the positions of all the individuals in the current optimum individual set, $delay_{v+1}(0)$ refers to the delay of the ternary FPRM circuit under the polarity corresponding to the position of the $(v+1)^{th}$ individual, $delay_{v-1}(0)$ refers to the delay of the ternary FPRM circuit under the polarity corresponding to the position of the $(v-1)^{th}$ individual, max(delay(0)) refers to the maximum value of the delay of the ternary FPRM circuit under the polarities corresponding to the positions of all the individuals in the current optimum individual set, and min(delay(0)) refers to the minimum value of the delay of the ternary FPRM circuit under the polarities corresponding to the positions of all the individuals in the current optimum individual set;

The method for calculating the crowding distance of the positions of the individuals in Step D and Step 7 is the same as the method for calculating the crowding distance of the positions of the individuals in Step 5.

In order to verify the effectiveness of the method for integrated optimization of a ternary FPRM circuit in optimizing the area, power consumption and delay of the ternary FPRM circuit, the method for integrated optimization of a ternary FPRM circuit (abbreviated to MOTLBO) is subject to contrastive analysis in the aspect of area, power consumption and delay with optimization methods based on a MOD-PSO (traditional multi-objective discrete particle swarm optimization) algorithm, an NSGA-II algorithm (traditional non-dominated sorting genetic algorithm) and a TLBO (traditional teaching-learning-based optimization) algorithm. The several methods are compiled by VC6.0 in a Windows 10 operating system, and the hardware environment of programs is Intel Core i7-6700HQ CPU (2.6 GHz), 8G RAM. Parameters are set as follows: the method for integrated optimization of a ternary FPRM circuit of the disclosure, the MODPSO algorithm and the NSGA-II algorithm search for an optimum solution set on the basis of the multi-objective optimization concept, and the scale of the external repository is 20; the GA algorithm searches for the optimum polarity through a weighting coefficient method, and the weighting parameters of the area, power consumption and delay are 0.333; and other parameters of the three algorithms are identical: the population size M is 40, and the maximum number of iterations is 120.

Table 1 shows the area, power consumption and delay of Benchmark circuits for the optimum polarity obtained through the MOTLBO algorithm, the TLBO algorithm, the MODPSO algorithm and the NSGA-II algorithm. Wherein, Column 1 shows circuit names, Column 2 shows the number of input variables of circuits, Column 3 shows accumulated values of the area of the circuits for the optimum polarity based on the TLBO algorithm after five times of operating, Column 4 shows the accumulated values of the power consumption of the circuits for the optimum polarity based on the TLBO algorithm after five times of operating, Column 5 shows the accumulated values of the delay of the circuits for the optimum polarity based on the TLBO algorithm after five times of operating, Column 6 shows the accumulated values of the area of the circuits for the optimum polarity based on the MODPSO algorithm after five times of operating, Column 7 shows the accumulated values of the power consumption of the circuits for the optimum polarity based on the MODPSO algorithm after five times of operating, Column 8 shows the accumulated values of the delay of the circuits for the optimum polarity based on the MODPSO algorithm after five times of operating, Column 9 shows the accumulated values of the area of the circuits for the optimum polarity based on the NSGA-II algorithm after five times of operating, Column 10 shows the accumulated values of the power consumption of the circuits for the optimum polarity based on the NSGA-II algorithm after five times of operating, Column 11 shows the accumulated values of the delay of the circuits for the optimum polarity based on the NSGA-II algorithm after five times of operating, Column 12 shows the accumulated values of the area of the circuits for the optimum polarity based on the MOTLBO algorithm after five times of operating, Column 13 shows the accumulated values of the power consumption of the circuits for the optimum polarity based on the MOTLBO algorithm after five times of operating, and Column 14 shows the accumulated values of the delay of the circuits for the optimum polarity based on the MOTLBO algorithm after five times of operating.

By the comparison of experiment results, the TLBO based on the weighting coefficient method can only search out one optimum polarity, and the MODPSO algorithm, the NSGA-II algorithm and the MOTLBO algorithm based on multi-objective optimization can search out an optimum polarity solution set, and the superiorities of the four algorithms cannot be verified easily. In consideration of this, it is necessary to process the optimum polarity solution set searched out by the MODPSO algorithm, the NSGA-II algorithm and the MOTLBO algorithm to select a polarity capable of realizing integrated optimization of the area, power consumption and delay of the circuits for comparison. Therefore, fitness of each polarity in the optimum polarity solution set in the external repository is calculated, the polarity with the minimum fitness is used as the optimum polarity for comparison, and the calculation formula for fitness is as follows:

$$fitness_\theta = \frac{area_\theta}{\sum_{\theta=1}^{number(rep)} area_\theta} + \frac{power_\theta}{\sum_{\theta=1}^{number(rep)} power_\theta} + \frac{delay_\theta}{\sum_{\theta=1}^{number(rep)} delay_\theta} \quad (19)$$

Wherein, number(rep) refers to the number of optimum solutions in the optimum polarity solution set, searched out through the algorithms, in the external repository, and θ refers to subscripts of the circuit area, power consumption and delay corresponding to each polarity in the optimum polarity solution set in the external repository.

TABLE 1

Experimental data of optimum polarities searched by MOTLBO algorithms and other algorithms

| benchmark | | TLBO | | | MODPSO | | | NSGA-II | | | MOTLBO | | |
|---|---|---|---|---|---|---|---|---|---|---|---|---|---|
| name | input | area | power | delay | area | power | delay | area | power | delay | area | power | delay |
| max46_d | 9 | 2862 | 894.87 | 59 | 2840 | 878.59 | 60 | 2936 | 951.12 | 59 | 2840 | 878.59 | 60 |
| sex | 9 | 963 | 301.64 | 50 | 945 | 286.16 | 50 | 968 | 306.45 | 50 | 945 | 286.16 | 50 |
| apla | 10 | 948 | 252.03 | 50 | 940 | 250.31 | 50 | 1096 | 282.03 | 50 | 940 | 250.31 | 50 |
| clpl | 12 | 90 | 31.79 | 30 | 90 | 32.31 | 32 | 90 | 32.06 | 31 | 90 | 31.70 | 30 |
| newapla | 12 | 215 | 75.68 | 35 | 227 | 58.52 | 40 | 239 | 53.17 | 40 | 235 | 52.36 | 40 |
| t4 | 12 | 285 | 58.78 | 40 | 275 | 49.84 | 44 | 292 | 61.95 | 43 | 275 | 47.65 | 45 |
| br1 | 12 | 523 | 148.47 | 45 | 531 | 144.28 | 45 | 563 | 147.77 | 45 | 515 | 148.54 | 45 |
| cm163a | 14 | 4215 | 1218.38 | 60 | 4089 | 1308.43 | 60 | 4443 | 1290.00 | 60 | 4215 | 1218.38 | 60 |
| cu | 14 | 109 | 23.73 | 35 | 107 | 25.12 | 35 | 117 | 22.80 | 35 | 115 | 19.55 | 35 |
| mp2d | 14 | 100 | 48.26 | 30 | 100 | 48.07 | 33 | 104 | 48.25 | 32 | 100 | 47.34 | 30 |
| pm1 | 16 | 170 | 81.87 | 40 | 170 | 81.87 | 40 | 175 | 86.24 | 39 | 170 | 81.87 | 40 |
| cm162a | 16 | 1135 | 448.48 | 50 | 1147 | 445.13 | 51 | 1286 | 499.57 | 54 | 1135 | 444.28 | 50 |

In Table 1, an optimum polarity capable of achieving integrated optimization of the circuit area, power consumption and delay is selected from the optimum solution set searched out by the MODPSO algorithm, the NSGA-II algorithm and the MOTLBO algorithm according to formula (19), and as can be seen from Table 1, compared with the other three algorithms, a single circuit performance indicator under the optimum polarity searched out by the MOTLBO algorithm may be poorer, while other performance indicators may be better. For example, in circuit t4, the circuit delay searched out by the MOTLBO algorithm is poorer than that searched out by the TLBO algorithm, the MODPSO algorithm and the NSGA-II algorithm, while the circuit area and power consumption searched out by the MOTLBO algorithm are better than those searched out by the other three algorithms.

Table 2 shows the comparison of optimization rates of the circuit area, power consumption and delay under the optimum polarity searched out by the MOTLBO algorithm compared with the TLBO algorithm, the MODPSO algorithm and the NSGA-II algorithm. Wherein, Column 1 shows circuit names, Column 2 shows the number of the input variables of the circuits, Column 3 shows the optimization rates of the accumulated values of the area of the MOTLBO algorithm compared with the TLBO algorithm, Column 4 shows the optimization rates of the accumulated values of the power consumption of the MOTLBO algorithm compared with the TLBO algorithm, Column 5 shows the optimization rates of the accumulated values of the delay of the MOTLBO algorithm compared with the TLBO algorithm, Column 6 shows the optimization rates of the accumulated values of the area of the MOTLBO algorithm compared with the MODPSO algorithm, Column 7 shows the optimization rates of the accumulated values of the power consumption of the MOTLBO algorithm compared with the MODPSO algorithm, Column 8 shows the optimization rates of the accumulated values of the delay of the MOTLBO algorithm compared with the MODPSO algorithm, Column 9 shows the optimization rates of the accumulated values of the area of the MOTLBO algorithm compared with the NSGA-II algorithm, Column 10 shows the optimization rates of the accumulated values of the power consumption of the MOTLBO algorithm compared with the NSGA-II algorithm, and Column 11 shows the optimization rates of the accumulated values of the delay of the MOTLBO algorithm compared with the NSGA-II algorithm.

Corresponding calculation formulas are as follows:

$$\text{area \%} = \frac{\text{area1}(\text{area2}, \text{area3}) - \text{area4}}{\text{area4}} \quad (20)$$

$$\text{power \%} = \frac{\text{power1}(\text{power2}, \text{power3}) - \text{power4}}{\text{power4}} \quad (21)$$

$$\text{delay \%} = \frac{\text{delay1}(\text{delay2}, \text{delay3}) - \text{delay4}}{\text{delay4}} \quad (22)$$

Wherein, area1(power1, delay1) refers to the accumulated value of the circuit area, power consumption and delay for the optimum polarity searched by the TLBO algorithm after five times of operating, area2(power2, delay2) refers to the accumulated value of the circuit area, power consumption and delay for the optimum polarity searched by the MODPSO algorithm after five times of operating, area3(power3, delay3) refers to the accumulated value of the circuit area, power consumption and delay for the optimum polarity searched by the NSGA-II algorithm after five times of operating, and area4(power4, delay4) refers to the accumulated value of the circuit area, power consumption and delay for the optimum polarity searched by the MOTLBO algorithm after five times of operating.

TABLE 2

Optimization rates the MOTLBO algorithm compared with other algorithms

| benchmark | | Optimization rates the MOTLBO algorithm compared with TLBO algorithm | | | Optimization rates the MOTLBO algorithm compared with MODPSO algorithm | | | Optimization rates the MOTLBO algorithm compared with NSGA-II algorithm | | |
|---|---|---|---|---|---|---|---|---|---|---|
| name | input | area% | power% | delay% | area% | area% | delay% | area% | power% | delay% |
| max46_d | 9 | 0.77% | 1.85% | −1.67% | 0.00% | 0.00% | 0.00% | 3.38% | 8.26% | −1.67% |
| sex | 9 | 1.90% | 5.40% | 0.00% | 0.00% | 0.00% | 0.00% | 2.43% | 7.09% | 0.00% |

TABLE 2-continued

Optimization rates the MOTLBO algorithm compared with other algorithms

| benchmark | | Optimization rates the MOTLBO algorithm compared with TLBO algorithm | | | Optimization rates the MOTLBO algorithm compared with MODPSO algorithm | | | Optimization rates the MOTLBO algorithm compared with NSGA-II algorithm | | |
|---|---|---|---|---|---|---|---|---|---|---|
| name | input | area% | power% | delay% | area% | area% | delay% | area% | power% | delay% |
| apla | 10 | 0.85% | 0.69% | 0.00% | 0.00% | 0.00% | 0.00% | 16.28% | 12.67% | 0.00% |
| clpl | 12 | 0.00% | 0.28% | 0.00% | 0.00% | 1.92% | 6.67% | 0.00% | 1.12% | 3.33% |
| newapla | 12 | −8.51% | 44.54% | −12.50% | −3.40% | 11.76% | 0.00% | 1.70% | 1.55% | 0.00% |
| t4 | 12 | 3.64% | 23.34% | −11.11% | 0.00% | 4.57% | −2.22% | 6.18% | 30.00% | −4.44% |
| brl | 12 | 1.55% | −0.05% | 0.00% | 3.11% | −2.87% | 0.00% | 9.32% | −0.52% | 0.00% |
| cm163a | 14 | 0.00% | 0.00% | 0.00% | −2.99% | 7.39% | 0.00% | 5.41% | 5.88% | 0.00% |
| cu | 14 | −5.22% | 21.35% | 0.00% | −6.96% | 28.46% | 0.00% | 1.74% | 16.59% | 0.00% |
| mp2d | 14 | 0.00% | 1.93% | 0.00% | 0.00% | 1.52% | 10.00% | 4.00% | 1.90% | 6.67% |
| pm1 | 16 | 0.00% | 0.00% | 0.00% | 0.00% | 0.00% | 0.00% | 2.94% | 5.34% | −2.50% |
| cm162a | 16 | 0.00% | 0.95% | 0.00% | 1.06% | 0.19% | 2.00% | 13.04% | 12.45% | 8.00% |
| Average-Saving% | | −0.42% | 8.36% | −2.11% | −0.77% | 4.41% | 1.37% | 5.54% | 8.53% | 0.78% |

As can be seen from Table 2, although a single circuit performance indicator for the optimum polarity searched out by the MOTLBO algorithm may be poorer compared with the TLBO algorithm, the MODPSO algorithm and the NSGA-II algorithm with the average optimization rate expressed as a negative number, for example, the average optimization rates of the circuit area and the delay are respectively −0.42%, −2.11%, or −0.77% and 1.37%, or 5.54% and 0.78%, in the process or circuit power consumption comparison, the MOTLBO algorithm manifests a prominent optimization effect, and the average optimization rates are respectively 8.36%, 4.41% and 8.53%. Finally, the variances of the results obtained by five times of operating of the four algorithm are calculated, wherein the variances of the circuit area, power consumption and delay for the optimum polarity searched out by the TLBO algorithm are respectively 2.15, 1.34 and 0.04, the variances of the circuit area, power consumption and delay for the optimum polarity searched out by the MODPSO algorithm are respectively 3.23, 1.19 and 1.17, the variances of the circuit area, power consumption and delay for the optimum polarity searched out by the NSGA-II algorithm are respectively 14.35, 4.24 and 0.24, and the variances of the circuit area, power consumption and delay for the optimum polarity searched out by the MOTLBO algorithm are respectively 0, 0 and 0.

Although the integrated performance indicator of circuits is of great importance for optimized design of the circuits, and the significance of independent performance indicators cannot be ignored. In consideration of this, the minimum values of the circuit area, power consumption and delay of each generation obtained after five times of operating are accumulated to analyze the iteration process of each circuit performance indicator in the polarity searching process of different algorithms. Wherein, FIG. 1 shows iterative evolution curves of the circuit area of each generation after five times of operating of the method of the disclosure and the three existing methods, FIG. 2 shows iterative evolution curves of the circuit power consumption of each generation after five times of operating of the method of the disclosure and the three existing methods, and FIG. 3 shows iterative evolution curves of the circuit delay of each generation after five times of operating of the method of the disclosure and the three existing methods.

Figure 2:
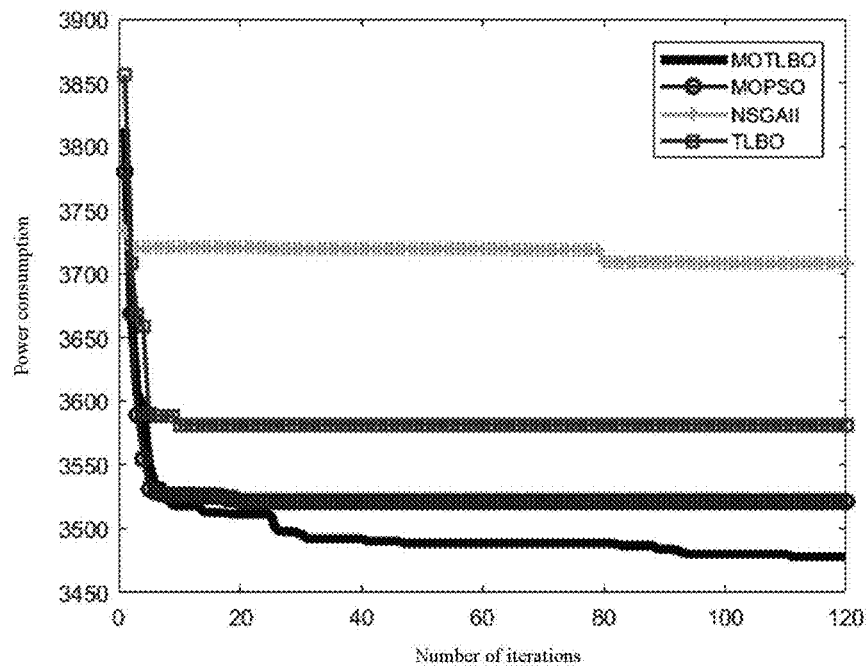
FIG. 2 is a diagram of iterative evolution curves of the circuit power consumption of each generation during after five times of operating of the method of the disclosure and the three existing methods.
Figure 3:
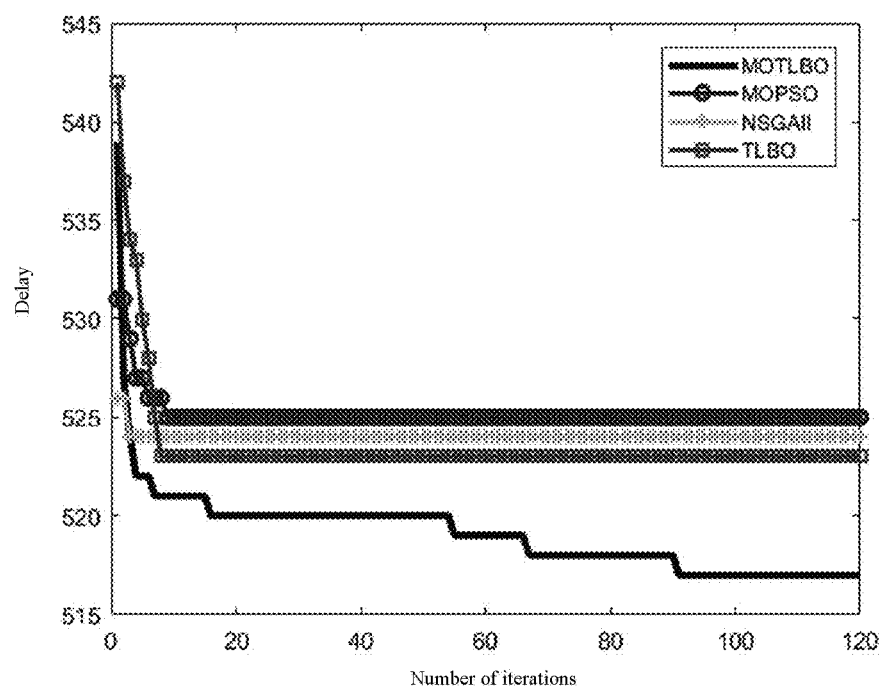
FIG. 3 is diagram of iterative evolution curves of the circuit delay of each generation after five times of operating of the method of the disclosure and the three existing methods.

As can be seen from FIG. 1, FIG. 2 and FIG. 3, the TLBO algorithm and the MODPSO algorithm have good convergence performance, but are likely to generate partial optimum solutions. The NSGA-II algorithm is poor in convergence performance and optimization effect and cannot search out the optimum polarity. Compared with other algorithms, the MOTLBO algorithm has good convergence performance, has an evolution function at the later operating stage, and can search out smaller areas, power consumption of delays of circuits.

From the above analysis, the optimization method of the disclosure has a better optimization effect on independent performance indicators as well as integrated performance indicators compared with the TLBO algorithm, the MODPSO algorithm and the NSGA-II algorithm.

What is claimed is:

1. A method for integrated optimization of a ternary Fixed-polarity Reed-Muller (FPRM) circuit, comprising: establishing an area estimation model, a power consumption estimation model and a delay estimation model of the ternary FPRM circuit under a p polarity; constructing a correlation between a multi-objective teaching-learning optimization algorithm and optimization of an area, power consumption and delay of the ternary FPRM circuit; expressing positions of individuals in the multi-objective teaching-learning optimization algorithm as polarities of the ternary FPRM circuit, and expressing a search space as a space for polarity selection of the ternary FPRM circuit; and finally, searching for a set of Pareto optimum polarity solutions for the area, power consumption and delay of the ternary FPRM circuit by means of the multi-objective teaching-learning optimization algorithm to complete the integrated optimization of the area, power consumption and delay of the ternary FRPM circuit.

2. The method for integrated optimization of a ternary FPRM circuit according to claim 1, wherein the specific process of establishing the area estimation model, the power consumption estimation model and the delay estimation model of the ternary FPRM circuit under the p polarity is as follows:
   a: a ternary FPRM function for the ternary FPRM circuit under the p polarity is expressed by the following expression:

$$f^p(x_{n-1}, x_{n-2}, \cdots, x_0) = \bigoplus_{i=0}^{3^n-1} b_i \cdot \prod_{j=0}^{n-1} x_j^{i_j} \tag{1}$$

wherein, n is the number of input variables of the function $f^p(x_{n-1},x_{n-2}, \ldots ,x_0)$; $x_{n-1},x_{n-2}, \ldots , x_0$ is the input variables of the function $f^p(x_{n-1},x_{n-2}, \ldots ,x_0)$; $\oplus$ is a sign of modulo-3 addition, and $\Sigma$ is a summation sign; $b_i$ is an AND term, and $b_i \in \{0,1,2\}$; i is an AND term ordinal, i=0, 1, 2, ..., $3^n-1$, i is expressed as $i_{n-1} i_{n-2} \ldots i_0$, $i_j \in \{0,1,2\}$ in a ternary manner, and j=0, 1, 2, ..., n−1; p is the polarity of the ternary FPRM circuit and is expressed as $p_{n-1}p_{n-2} \ldots p_0$ in a ternary manner;

$$\prod_{j=0}^{n-1} \dot{x}_j^{ij}$$

is a modulo-3 multiplication term, $\dot{x}_j^{ij}$ is the power form of the $j^{th}$ modulo-3 multiplication term, and the expression form of the power form $\dot{x}_j^{ij}$ is determined by the polarity p and the AND term ordinal i;

in the case of $p_j=0$, $\dot{x}_j^{ij}$ appears in the modulo-3 multiplication term in an original power form $x_j^{ij}$; if $i_j=0$, $\dot{x}_j^{ij}=1$; if $i_j=1$, $\dot{x}_j^{ij}=x_j$; if $i_j=2$, $\dot{x}_j^{ij}=x_j^2$; $x_j^2=x_j \cdot x_j$, and "·" is a multiplication symbol;

in the case of $p_j=1$, $\dot{x}_j^{ij}$ appears in the modulo-3 multiplication term in a complementary power form $(x_j \oplus 1)^{ij}$; if $i_j=0$, $\dot{x}_j^{ij}=1$; if $i_j=1$, $\dot{x}_j^{ij}=x_j \oplus 1$; if $i_j=2$, $\dot{x}_j^{ij}=(x_j \oplus 1)^2$;

in the case of $p_j=2$, $\dot{x}_j^{ij}$ appears in the modulo-3 multiplication term in a complementary power form $(x_j \oplus 2)^{ij}$; if $i_j=0$, $\dot{x}_j^{ij}=1$; if $i_j=1$, $\dot{x}_j^{ij}=X_j \oplus 2$; if $i_j=2$, $\dot{x}_j^{ij}=(x_j \oplus 2)^2$;

b: the ternary FPRM circuit under the p polarity consists of multi-input modulo-3 addition terms regarded as multi-input modulo-3 addition gates and multi-input modulo-3 multiplication terms regarded as multi-input modulo-3 multiplication gates; all the multi-input modulo-3 multiplication gates in the ternary FPRM circuit expressed by the ternary FPRM function expression under the p polarity are decomposed into two-input modulo-3 multiplication gates by means of the Huffman algorithm, and the number of the two-input modulo-3 multiplication gates obtained by decomposition is marked as No.Mod_3M; then all the multi-input modulo-3 addition gates in the ternary FPRM circuit under the p polarity are decomposed into two-input modulo-3 addition gates by means of the Huffman algorithm, and the number of the two-input modulo-3 addition gates obtained by decomposition is marked as No.Mod_3A;

c: the area of the ternary FPRM circuit under the p polarity is marked as area(p), and the area estimation model of the ternary FPRM circuit under the p polarity is:

$$\text{area}(p) = \text{No.Mod\_3}A + \text{No.Mod\_3}M \quad (2)$$

d: in the decomposed ternary FPRM circuit under the p polarity, a path having the fewest two-input modulo-3 multiplication gates and two-input modulo-3 addition gates from an input signal to an output signal is used as a key path, and the number of the two-input modulo-3 multiplication gates and the two-input modulo-3 addition gates on the key path is marked as num(key);

e: the delay of the ternary FPRM circuit under the p polarity is marked as delay(p), and the delay estimation model of the ternary FPRM circuit under the p polarity is:

$$\text{delay}(p) = \text{num(key)} \quad (3)$$

f: the power consumption of the ternary FPRM circuit is marked as power (p), and power consumption of all the two-input modulo-3 addition gates and the two-input modulo-3 multiplication gates in the decomposed ternary FPRM circuit under the p polarity is used as the power consumption of the ternary FPRM circuit under the p polarity, wherein the power consumption of each two-input modulo-3 addition gate is represented by an on-off activity, the power consumption of each two-input modulo-3 multiplication gate is represented by an on-off activity, the on-off activity of each two-input modulo-3 addition gate is represented by the probability of an output variable of the two-input modulo-3 addition gate, and the on-off activity of each two-input modulo-3 multiplication gate is represented by the probability of an output variable of the two-input modulo-3 multiplication gate;

the probability of the output variable of the $k^{th}$ two-input modulo-3 multiplication gate in the decomposed ternary FPRM circuit under the p polarity is calculated according to formula (4), formula (5) and formula (6), wherein k=1, 2, ..., No.Mod_3M;

$$P_{mul1}^k = Pk_{1-1} \cdot Pk_{2-1} + Pk_{1-2} \cdot P_{2-2} \quad (4)$$

$$P_{mul2}^k = Pk_{1-1} \cdot Pk_{2-2} + Pk_{1-2} \cdot Pk_{2-1} \quad (5)$$

$$P_{mul0}^k = 1 - P_{mul1}^k - P_{mul2}^k \quad (6)$$

wherein, $P_{mul1}^k$ refers to the probability of 1 of the output variable of the $k^{th}$ two-input modulo-3 multiplication gate in the decomposed ternary FPRM circuit under the p polarity; $P_{mul2}^k$ refers to the probability of 2 of the output variable of the $k^{th}$ two-input modulo-3 multiplication gate in the decomposed ternary FPRM circuit under the p polarity; $P_{mul0}^k$ refers to the probability of 0 of the output variable of the $k^{th}$ two-input modulo-3 multiplication gate in the decomposed ternary FPRM circuit under the p polarity; $Pk_{1-1}$ refers to the probability of 1 of a first input variable of the $k^{th}$ two-input modulo-3 multiplication gate in the decomposed ternary FPRM circuit under the p polarity, $Pk_{1-2}$ refers to the probability of 2 of the first input variable of the $k^{th}$ two-input modulo-3 multiplication gate in the decomposed ternary FPRM circuit under the p polarity, $Pk_{2-1}$ refers to the probability of 1 of a second input variable of the $k^{th}$ two-input modulo-3 multiplication gate in the decomposed ternary FPRM circuit under the p polarity, and $Pk_{2-2}$ refers to the probability of 2 of the second input variable of the $k^{th}$ two-input modulo-3 multiplication gate in the decomposed ternary FPRM circuit under the p polarity, wherein $Pk_{1-1}$, $Pk_{1-2}$, $Pk_{2-1}$, and $Pk_{2-2}$ are random numbers from 0 to 1;

the probability of the output variable of the $g^{th}$ two-input modulo-3 addition gate in the decomposed ternary FPRM circuit under the p polarity is calculated according to formula (7), formula (8) and formula (9), wherein g=1, 2, ..., No.Mod_3A;

$$Q_{add1}^g = Qg_{1-1} \cdot (1-Qg_{2-1}-Qg_{2-2}) + Qg_{1-2} \cdot Qg_{2-2} + Qg_{2-1} \cdot (1-Qg_{1-1}-Qg_{1-2}) \quad (7)$$

$$Q_{add2}^g = Qg_{1-2} \cdot (1-Qg_{2-1}-Qg_{2-2}) + Qg_{1-1} \cdot Qg_{2-1} + Qg_{2-2} \cdot (1-Qg_{1-1}-Qg_{1-2}) \quad (8)$$

$$Q_{add0}^g = 1 - Q_{add1}^g - Q_{add2}^g \quad (9)$$

wherein, $Q_{add1}^g$ refers to the probability of 1 of the output variable of the $g^{th}$ two-input modulo-3 addition gate in the decomposed ternary FPRM circuit under the p polarity, $Q_{add2}^g$ refers to the probability of 2 of the output variable of the $g^{th}$ two-input modulo-3 addition gate in the decomposed ternary FPRM circuit under the p polarity, $Q_{add0}^g$ refers to the probability of 0 of the output variable of the $g^{th}$ two-input modulo-3 addition gate in the decomposed ternary FPRM circuit under the p polarity, $Qg_{1-1}$ refers to the probability of 1 of a first input variable of the $g^{th}$ two-input modulo-3 addition gate in the decomposed ternary FPRM circuit under the p polarity, $Qg_{1-2}$ refers to the probability of 2 of the first input variable of the $g^{th}$ two-input modulo-3 addition gate in the decomposed ternary FPRM circuit under the p polarity, $Qg_{2-1}$ refers to the probability of 1 of a second input variable of the $g^{th}$ two-input modulo-3 addition gate in the decomposed ternary FPRM circuit under the p polarity, and $Qg_{2-2}$ refers to the probability of 2 of the second input variable of the $g^{th}$ two-input modulo-3 addition gate in the decomposed ternary FPRM circuit under the p polarity, wherein $Qg_{1-1}$, $Qg_{1-2}$, $Qg_{2-1}$ and $Qg_{2-2}$ are random numbers from 0 to 1;

g: the power consumption of the ternary FPRM circuit is calculated according to the accumulation probability of the output variable of each two-input modulo-3 addition gate and the accumulation probability of the output variable of each two-input modulo-3 multiplication gate in the decomposed ternary FPRM circuit under the p polarity, and the power consumption estimation model of the ternary FPRM circuit under the p polarity is:

$$\text{power}(p) = 2\left[\sum_{k=1}^{No.Mod\_3M}(P_{mul1}^k + P_{mul2}^k) + \sum_{g=1}^{No.Mod\_3A}(Q_{add1}^g + Q_{add2}^g)\right]. \quad (10)$$

3. The method for integrated optimization of a ternary FPRM circuit according to claim 1, wherein the specific process of searching for the set of Pareto optimum polarity solution for the area, power consumption and delay of the ternary FPRM circuit by means of the multi-objective teaching-learning optimization algorithm is as follows:

step 1: a population size is set as M, wherein M is an integer which is greater than or equal to 10 and smaller than or equal to 100, the position of each individual corresponds to one polarity of the ternary FPRM circuit; the number of total iterations of the multi-objective teaching-learning optimization algorithm set as T, wherein T is an integer which is greater than or equal to 100 and smaller than or equal to 500; the current iteration is set as a variable t, and the variable t is set to 0; the ternary FPRM function expression under the polarity corresponding to the position of each individual in the current population is obtained by means of a polarity conversion technique, and the area, power consumption and delay of the ternary FPRM circuit under each polarity are obtained in accordance with Step b to Step g;

step 2: a polarity domination rule is set: the polarities corresponding to the positions of any two individuals in the population are marked as $P_1$ and $P_2$, if $P_1$ and $P_2$ meet:

$$\left.\begin{array}{l}\text{area}(P_1) \le \text{area}(P_2) \\ \text{power}(P_1) \le \text{power}(P_2) \\ \text{delay}(P_1) \le \text{delay}(P_2)\end{array}\right\} \quad (11)$$

it is determined that $P_1$ dominates $P_2$, which is marked as $P_1 \succ P_2$, and in this case, the individual corresponding to $P_1$ dominates the individual corresponding to $P_2$; if the polarity $P_1$ is not dominated by the polarity corresponding to the position of any individual in the current population, $P_1$ is taken as one of the optimum polarity solutions of the Pareto relationship among the area, power consumption and delay of the ternary FPRM circuit;

step 3: the polarity corresponding to the position of each individual in the current population is compared with the polarities corresponding to the positions of other individuals in the current population according to the polarity domination rule, the number of times of each individual being dominated by other individuals is calculated, and the non-dominant level of each individual is determined according to the number of times of each individual being dominated by other individuals; the non-dominant level of the individual which not dominated by all other individuals in the current population is set as the minimum level, and the non-dominant levels of these individuals increase with the increase of the number of times of these individuals being dominated by the individual with the smaller non-dominant level; if there are multiple individuals that are dominated by other individuals by the same times, the non-dominant levels of these population levels are identical; and the individuals with the minimum non-dominant level in the current population are acquired, and a current optimum individual set is formed by the individuals with the minimum non-dominant level acquired from the current population;

step 4: an external repository for storing current optimum polarities is set, and the number of polarities capable of being stored by the external repository is marked as num(rep), wherein num(rep) is an integer which is greater than or equal to 10 and smaller than or equal to M; and the external repository having $t^{th}$-generation optimum polarities stored therein is called a $t^{th}$-generation external repository;

step 5: individuals in the current optimum individual set are counted; if the number of the individuals in the current optimum individual set is smaller than or equal to num(rep), the polarities corresponding to the positions of the individuals in the current optimum individual set are all placed into the external repository; if the number of the individuals in the current optimum individual set is greater than num(rep), the crowding distance of the position of each individual in the current optimum individual set is calculated, num(rep) individuals are selected according to the crowding distances from high to low, and the polarities corresponding to the positions of the selected individuals are placed in the external repository to obtain the $t^{th}$-generation external repository;

step 6: a value obtained by adding 1 to the current value of the variable t is used to update the variable t to obtain an updated variable t, the $t^{th}$-generation individual is derived from the $(t-1)^{th}$-generation individual, and the specific process is as follows:

A: primary variation is carried out on each individual in the $(t-1)^{th}$-generation population specifically as follows:

A-1: a mean and a teaching factor of the position, from the $1^{st}$ digit to the $n^{th}$ digit, of each individual in the $(t-1)^{th}$-generation population are calculated according to formula (12) and formula (13):

$$mean_q = \frac{1}{M}\sum_{h=1}^{M} X_{hq}^{old} \qquad (12)$$

$$T_{hq} = \text{round}[1 + \text{rand}(0, 1)] \qquad (13)$$

wherein, $mean_q$ refers to the mean of the $q^{th}$ digit of the position of each individual in the $(t-1)^{th}$-generation population, and q=1, 2, ..., n; $X_{hq}^{old}$ refers to the $q^{th}$ digit of the position of the $h^{th}$ individual in the $(t-1)^{th}$-generation population, and h=1, 2, ... M; $T_{hq}$ refers to the variation factor of the $q^{th}$ digit of the $h^{th}$ individual in the $(t-1)^{th}$-generation population, rand (0,1) refers to a random number which is greater than or equal to 0 and smaller than or equal to 1, round (•) refers to rounding-off performed on the value of 1+rand (0,1) to obtain an integer;

A-2: M random number sets are sequentially generated by a random function, and the random number set generated at the $a^{th}$ time is taken as a $a^{th}$ random number set which is marked as $r_a$, wherein a=1, 2, ..., M, and each random number set includes n random numbers which are greater than or equal to 0 and smaller than or equal to 1;

A-3: the positions of the individuals corresponding to all the polarities in the $(t-1)^{th}$-generation external repository are taken as a group, the crowding distance of each individual in the group and the sum of the crowding distances of all the individuals in the group are calculated, and a value obtained by dividing the crowding distance of the position of each individual in the group by the sum of the crowding distances of the positions of all the individuals in the group is taken as the probability of being selected of the polarity corresponding to the position of each individual in the group, and in this way, the probability of being selected of all the polarities in the $(t-1)^{th}$-generation external repository is obtained; then, a random number from 0 to 1 is generated by the random function, polarities are sequentially selected from the $(t-1)^{th}$-generation external repository through a roulette method, the probability of being selected of the selected polarities is compared with the random number, the first selected polarity with the probability of being selected greater than the random number is taken as a $t^{th}$-generation optimum individual, and the difference between the mean of the $q^{th}$ digit of the position of the $t^{th}$-generation optimum individual and the mean of the $q^{th}$ digit of the position of the $h^{th}$ individual in the $(t-1)^{th}$-generation population is calculated according to formula (14);

$$\Delta_{hq} = r_{hq} \cdot (X_q^{best} - T_{hq} \cdot mean_q) \qquad (14)$$

wherein, $\Delta_{hq}$ refers to the difference between the mean of the $q^{th}$ digit of the position of the $t^{th}$-generation optimum individual and the mean of the $q^{th}$ digit of the position of the $h^{th}$ individual in the $(t-1)^{th}$-generation population, $X_q^{best}$ refers to the $q^{th}$ digit of the position of the $t^{th}$-generation optimum individual, and $r_{hq}$ refers to the $q^{th}$ random number in the $h^{th}$ random number set $r_h$;

A-4: primary variation parameters of the position, from the $1^{st}$ digit to the $n^{th}$ digit, of each individual in the $(t-1)^{th}$-generation population are calculated according to formula (15):

$$X_{hq}^{new} = \text{round}(X_{hq}^{old} + \Delta_{hq}) \qquad (15)$$

wherein, $X_{hq}^{old}$ refers to the $q^{th}$ digit of the position of the $h^{th}$ individual in the $(t-1)^{th}$-generation population, and $X_{hq}^{new}$ refers to the primary variation parameter of the $q^{th}$ digit of the position of the $h^{th}$ individual in the $(t-1)^{th}$-generation population;

A-5: variation is carried out according to the value of $X_{hq}^{new}$; if $X_{hq}^{new}$ is greater than 2, the $q^{th}$ digit of the position of the $h^{th}$ individual in the $(t-1)^{th}$-generation population is changed into 2; if $X_{hq}^{new}$ is smaller than 0, the $q^{th}$ digit of the position of the $h^{th}$ individual in the $(t-1)^{th}$-generation population is changed into 0; if $X_{hq}^{new}$ is greater than or equal to 0 and is smaller than or equal to 2, the $q^{th}$ digit of the position of the $h^{th}$ individual in the $(t-1)^{th}$-generation population is changed into $X_{hq}^{new}$, so that a $t^{th}$-genera ion primary variation population is obtained;

B: secondary variation is carried out on the position of each individual in the $t^{th}$-generation primary variation population specifically as follows:

B-1: M random number sets are sequentially generated by a random function, the random number set generated at the $a^{th}$ time is used as a $a^{th}$ random number set which is marked as $r_a$, and the random number set $r_a$ includes n random numbers which are greater than or equal to 0 and smaller than or equal to 1; a random number set including M random integers which are greater than or equal to 1 and smaller than or equal to M is generated by the random function and is marked as Q, and the $a^{th}$ random number in the random number set Q is marked as $Q_a$;

B-2: a ternary FPRM function expression under the polarity corresponding to the position of each individual in the $t^{th}$-generation primary variation population is obtained by means of the polarity conversion technique, and the area, power consumption and delay of the ternary FPRM circuit under the polarity corresponding to each individual in the $t^{th}$-generation primary variation population are calculated in accordance with Step b to Step g;

B-3: the polarity corresponding to the position of the $Q_a^{th}$ individual in the $t^{th}$-generation primary variation population is compared with the polarity corresponding to the position of the $a^{th}$ individual in the $t^{th}$-generation primary variation population according to the polarity domination rule to obtain a non-dominant relationship between the polarity corresponding to the position of the $Q_a^{th}$ individual in the $t^{th}$-generation primary variation population and the polarity corresponding to the position of the $a^{th}$ individual in the $t^{th}$-generation primary variation population: if the polarity corresponding to the position of the $a^{th}$ individual in the $t^{th}$-generation primary variation population dominates the polarity corresponding to the position of the $Q_a^{th}$ individual in the $t^{th}$-generation primary variation population, or the polarity corresponding to the position of the $a^{th}$ individual in the $t^{th}$-generation primary variation population does not dominate the polarity corresponding to the position of the $Q_a^{th}$ individual in the $t^{th}$-generation primary variation population and is not dominated by the polarity corresponding to the position of the $Q_a^{th}$ individual in the $t^{th}$-generation primary variation population either, a secondary variation parameter of the $q^{th}$ digit of the position the $a^{th}$ individual in the $t^{th}$-generation primary variation population is calculated according to formula (16):

$$X_{aq}^{NEW} = \text{round}(S_{aq}^{new} + R_{aq} \cdot (S_{aq}^{new} - S_{Q_a q}^{new})) \qquad (16)$$

if the polarity corresponding to the position of the $a^{th}$ individual in the $t^{th}$-generation primary variation population is dominated by the polarity corresponding to the position of the $Q_a^{th}$ individual in the $t^{th}$-generation primary variation population, a secondary variation parameter of the $q^{th}$ digit of the position of the $a^{th}$ individual in the $t^{th}$-generation primary variation population is calculated according to formula (17):

$$X_{aq}^{NEW} = \text{round}(S_{aq}^{new} + R_{aq} \cdot (S_{Q_a q}^{new} - S_{aq}^{new})) \qquad (17)$$

wherein, $X_{aq}^{NEW}$ refers to the secondary variation parameter of the $q^{th}$ digit of the position of the $a^{th}$ individual in the $t^{th}$-generation primary variation population, $R_{aq}$ refers to the $q^{th}$ random number in the $a^{th}$ random number set, $S_{aq}^{new}$ refers to the $q^{th}$ digit of the position of the $a^{th}$ individual in the $t^{th}$-generation primary variation population, and $S_{Q_a q}^{new}$ refers to the $q^{th}$ digit of the position of the $Q_a^{th}$ individual in the $t^{th}$-generation primary variation population;

B-4: variation is carried out according to the value of $X_{aq}^{NEW}$; if $X_{aq}^{NEW}$ is greater than 2, the $q^{th}$ digit of the position of the $a^{th}$ individual in the $t^{th}$-generation primary variation population is changed into 2; if $X_{aq}^{NEW}$ is smaller than 0, the $q^{th}$ digit of the position of the $a^{th}$ individual in the $t^{th}$-generation primary variation population is changed into 0; if $X_{aq}^{NEW}$ is greater than or equal to 0 and smaller than or equal to 2, the $q^{th}$ digit of the position of the $a^{th}$ individual in the $t^{th}$-generation primary variation population is changed into $X_{aq}^{NEW}$, so that a $t^{th}$-generation secondary variation population is obtained;

C: a ternary FPRM function expression under the polarity corresponding to the position of each individual in the $t^{th}$-generation secondary variation population is obtained by means of the polarity conversion technique, and the area, power consumption and delay of the ternary FPRM circuit under each polarity are calculated in accordance with Step b to Step g;

D: the $(t-1)^{th}$-generation population and the $t^{th}$-generation secondary variation population are combined into a first new population, the non-dominant level of each individual in the first new population is obtained in accordance with Step 2 and Step 3, and M individuals are selected from the first new population according to the non-dominant levels from low to high; if the number of all the individuals from the minimum non-dominant level to a certain non-dominant level is exactly equal to M, the M individuals are used to construct a $t^{th}$-generation population; if the number of all the individuals from the minimum non-dominant level to a certain non-dominant level is smaller than M and the number of all individuals from the minimum non-dominant level to a non-dominant level one level higher than the certain non-dominant level is greater than M, the crowding distances of all the individuals under the non-dominant level one level higher than the certain non-dominant level are calculated, the corresponding number of individuals are selected according to the crowding distances from high to low to make sure that the sum of the number of the individuals from the minimum non-dominant level to the certain non-dominant level and the number of the individuals selected from the non-dominant level one level higher than the certain non-dominant level is equal to M, and the M individuals are used to construct a $t^{th}$-generation population;

step 7: the external repository is updated specifically as follows: the individuals corresponding to all the polarities in the $t^{th}$-generation population and the $(t-1)^{th}$-generation external repository are combined to form a second new population, the non-dominant level of each individual in the second new population is obtained in accordance with Step 2 and Step 3, the polarities in the $(t-1)^{th}$-generation external repository are cleared away, and individuals with the minimum non-dominant level in the second new population are counted; if the number of the individuals with the minimum non-dominant level in the second new population is smaller than or equal to num(rep), the polarities corresponding to all the individuals with the minimum non-dominant level in the second new population are placed into the external repository; if the number of the individuals with the minimum non-dominant level in the second new population is greater than num(rep), the crowding distance of the position of each individual with the minimum non-dominant level is calculated, num(rep) individuals with the minimum non-dominant level are selected according to the crowding distances from high to low, and the polarities corresponding to the positions of the num(rep) selected individuals with the minimum non-dominant level are placed in the external repository, so that a $t^{th}$-generation external repository is obtained;

step 8: whether t is equal to T is determined; if yes, the polarities stored in the $t^{th}$-generation external repository forms an optimum polarity set meeting the Pareto relationship for the area, power consumption and delay of the ternary FPRM circuit, and optimization is ended; or if not, Step 6 is performed again for the next iteration.

4. The method for integrated optimization of a ternary FPRM circuit according to claim 3, wherein the crowding distance of the position of each individual in the current optimum individual set is calculated in Step 5 specifically as follows:

step 5-1: the number of all the individuals in the current optimum individual set is marked as size(rep);

step 5-2: the area, power consumption and delay of the ternary FPRM circuit under the polarity corresponding to the position of each individual in the current optimum individual set are calculated in accordance with Step b and Step f, the individuals are ranked according to areas from small to large, and the crowding distance of the current $z^{th}$ individual is marked as $distance_z(0)$, wherein $z=1, 2, \ldots$, size(rep);

step 5-3: the crowding distance of the $1^{st}$ individual is made to meet $distance_1(0)=10000$, and the crowding distance of the $(size(rep))^{th}$ individual is made to meet $distance_{size(rep)}(0)=10000$;

step 5-4: the crowding distance of each individual from the $2^{nd}$ individual to the $(size(rep)-1)^{th}$ individual is calculated according to formula (18):

$$distance_v(0) = \frac{area_{v+1}(0) - area_{v-1}(0)}{\max(area(0)) - \min(area(0))} + \qquad (18)$$
$$\frac{power_{v+1}(0) - power_{v-1}(0)}{\max(power(0)) - \min(power(0))} + \frac{delay_{v+1}(0) - delay_{v-1}(0)}{\max(delay(0)) - \min(delay(0))}$$

wherein, $distance_v(0)$ refers to the crowding distance of the $v^{th}$ individual, $v=2, 3, \ldots$, size(rep)$-1$, $area_{v+1}(0)$ refers to the area of the ternary FPRM circuit under the polarity corresponding to the position of the $(v+1)^{th}$ individual, $area_{v-1}(0)$ refers to the area of the ternary FPRM circuit under the polarity corresponding to the position of the $(v-1)^{th}$ individual, max(area(0)) refers to the maximum value of the area of the ternary FPRM circuit under the polarities corresponding to the positions of all the individuals in the current optimum individual set, min(area(0)) refers to the minimum value of the area of the ternary FPRM circuit under the polarities corresponding to the positions of all the individuals in the current optimum individual set, $power_{v+1}(0)$ refers to the power consumption of the ternary FPRM circuit under the polarity corresponding to the position of the $(v+1)^{th}$ individual, $power_{v-1}(0)$ refers to the power consumption of the ternary FPRM circuit under the polarity corresponding to the position of the $(v-1)^{th}$ individual, min(power(0)) refers to the maximum value of the power consumption of the ternary FPRM circuit under the polarities corresponding to the positions of all the individuals in the current optimum individual set, min (power(0))refers to the minimum value of the power consumption of the ternary FPRM circuit under the polarities corresponding to the positions of all the individuals in the current optimum individual set, $delay_{v+1}(0)$ refers to the delay of the ternary FPRM circuit under the polarity corresponding to the position of the $(v+1)^{th}$ individual, $delay_{v-1}(0)$ refers to the delay of the ternary FPRM circuit under the polarity corresponding to the position of the $(v-1)^{th}$ individual, max(delay(0)) refers to the maximum value of the delay of the ternary FPRM circuit under the polarities corresponding to the positions of all the individuals in the current optimum individual set, and min(delay(0)) refers to the minimum value of the delay of the ternary FPRM circuit under the polarities corresponding to the positions of all the individuals in the current optimum individual set;

the method for calculating the crowding distance of the positions of the individuals in Step D and Step 7 is the same as the method for calculating the crowding distance of the positions of the individuals in Step 5.

* * * * *